(12) United States Patent
Gomi

(10) Patent No.: US 8,737,768 B2
(45) Date of Patent: May 27, 2014

(54) IMAGE PROCESSING DEVICE, METHOD, AND PROGRAM

(75) Inventor: Shinichiro Gomi, Chiba (JP)

(73) Assignee: Sony Corporation, Tokyo (JP)

( * ) Notice: Subject to any disclaimer, the term of this patent is extended or adjusted under 35 U.S.C. 154(b) by 235 days.

(21) Appl. No.: 13/208,105

(22) Filed: Aug. 11, 2011

(65) Prior Publication Data

US 2012/0045122 A1 Feb. 23, 2012

(30) Foreign Application Priority Data

Aug. 19, 2010 (JP) ................................ P2010-183877

(51) Int. Cl.
*G06K 9/32* (2006.01)
(52) U.S. Cl.
USPC ........... 382/286; 345/420; 345/440; 345/604; 345/619; 382/132; 382/154; 382/203; 382/254; 382/277; 382/296
(58) Field of Classification Search
CPC .............................. G06K 9/00677; G06T 7/608
See application file for complete search history.

(56) References Cited

U.S. PATENT DOCUMENTS

| | | | | |
|---|---|---|---|---|
| 4,797,842 A * | 1/1989 | Nackman et al. | ............... | 716/55 |
| 4,933,865 A * | 6/1990 | Yamamoto et al. | ............ | 382/203 |
| 5,349,379 A * | 9/1994 | Eichenlaub | ...................... | 348/59 |
| 5,664,081 A * | 9/1997 | Saito | ............................ | 345/619 |
| 5,712,732 A * | 1/1998 | Street | ............................ | 359/630 |
| 5,831,670 A | 11/1998 | Suzuki | | |
| 5,832,115 A * | 11/1998 | Rosenberg | ................... | 382/199 |
| 5,877,774 A * | 3/1999 | Saito | ............................ | 345/440 |
| 5,936,628 A * | 8/1999 | Kitamura et al. | ............. | 345/420 |
| 5,936,774 A * | 8/1999 | Street | ............................ | 359/630 |
| 5,991,073 A * | 11/1999 | Woodgate et al. | ............. | 359/462 |
| 6,018,352 A * | 1/2000 | Saito | ............................ | 345/678 |
| 6,195,470 B1 * | 2/2001 | Sasaki et al. | .................. | 382/277 |
| 6,263,097 B1 * | 7/2001 | Dewaele | ...................... | 382/132 |
| 6,292,195 B1 * | 9/2001 | Shimizu et al. | ............... | 345/604 |
| 7,224,526 B2 * | 5/2007 | Putilin et al. | .................. | 359/462 |
| 7,796,839 B2 * | 9/2010 | Dewaele | ...................... | 382/296 |
| 8,494,297 B2 * | 7/2013 | Zhang et al. | .................. | 382/254 |

(Continued)

FOREIGN PATENT DOCUMENTS

| | | |
|---|---|---|
| JP | 4029174 | 10/2007 |
| JP | 2008-81246 | 4/2008 |

(Continued)

OTHER PUBLICATIONS

European Search Report issued Dec. 23, 2011 in Munich for corresponding European patent application No. EP 11 17 7082.

*Primary Examiner* — Tsung-Yin Tsai
(74) *Attorney, Agent, or Firm* — Finnegan Henderson Farabow Garrett & Dunner LLP

(57) ABSTRACT

A device for processing an input image may include a degree-of-symmetry calculation unit, which may be configured to receive the input image and calculate a degree of symmetry of the input image. The device may also include a parting line detection unit, which may be configured to receive the input image and detect a parting line that separates two sides of the input image. Additionally, the device may include a classification unit, which may be configured to classify the input image based on the degree of symmetry and the parting line. The classification unit may also be configured to generate a classification signal to cause at least one of display or storage of the classification.

9 Claims, 35 Drawing Sheets

(56) References Cited

U.S. PATENT DOCUMENTS

| | | | |
|---|---|---|---|
| 2004/0227992 A1* | 11/2004 | Putilin et al. | 359/462 |
| 2005/0063582 A1* | 3/2005 | Park et al. | 382/154 |
| 2005/0264651 A1* | 12/2005 | Saishu et al. | 348/51 |
| 2007/0019936 A1* | 1/2007 | Birkenbach et al. | 396/14 |
| 2007/0286490 A1* | 12/2007 | Danowitz | 382/195 |
| 2009/0073087 A1* | 3/2009 | Janson et al. | 345/55 |
| 2011/0051239 A1* | 3/2011 | Daiku | 359/464 |
| 2011/0234605 A1* | 9/2011 | Smith et al. | 345/522 |
| 2013/0050197 A1* | 2/2013 | Oosawa | 345/419 |

FOREIGN PATENT DOCUMENTS

| | | |
|---|---|---|
| JP | 2009-159023 | 7/2009 |
| JP | 2010-62767 | 3/2010 |
| WO | WO 2009/015501 | 2/2009 |
| WO | WO 2009/078701 | 6/2009 |

* cited by examiner

FIG. 36

| DEGREE OF UP-DOWN SYMMETRY / DEGREE OF LEFT-RIGHT SYMMETRY | DEGREE OF UP-DOWN SYMMETRY ≥ Th_TB | | | DEGREE OF UP-DOWN SYMMETRY < Th_TB |
|---|---|---|---|---|
| DEGREE OF LEFT-RIGHT SYMMETRY ≥ Th_LR | UP-DOWN AND LEFT-RIGHT SYMMETRY | | | UPPER SIDE OF HORIZONTAL PARTING LINE |
| | | | | BETWEEN HORIZONTAL PARTING LINES |
| | | | | LOWER SIDE OF HORIZONTAL PARTING LINE |
| | | | | OTHER |
| DEGREE OF LEFT-RIGHT SYMMETRY < Th_LR | LEFT SIDE OF VERTICAL PARTING LINE | BETWEEN VERTICAL PARTING LINES | RIGHT SIDE OF VERTICAL PARTING LINE | UPPER RIGHT OBLIQUE PARTING LINE |
| | | | | UPPER LEFT OBLIQUE PARTING LINE |
| | OTHER | | | OTHER |

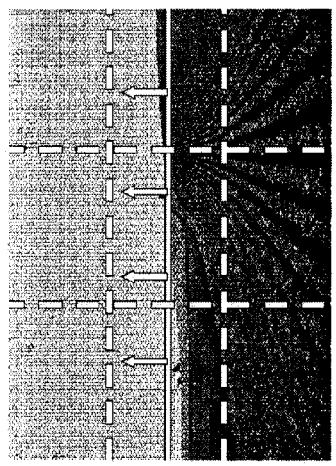
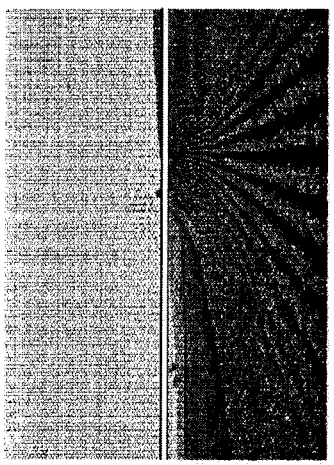
FIG. 44
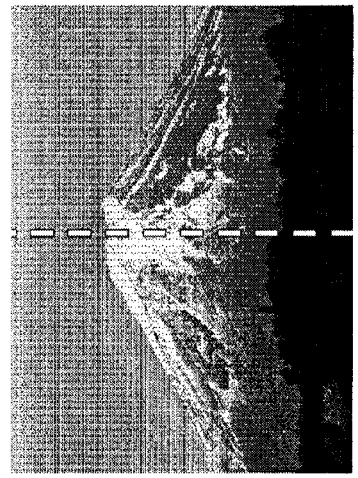
FIG. 45

IMAGE PROCESSING DEVICE, METHOD, AND PROGRAM

CROSS-REFERENCE TO RELATED APPLICATION

This application claims priority of Japanese Patent Application No. 2010-183877, filed on Aug. 19, 2010, the entire content of which is hereby incorporated by reference.

BACKGROUND

The present disclosure relates to an image processing device and an image processing method, and a program, and in particular, the present disclosure relates to an image processing device and an image processing method, and a program, which are capable of classifying the composition of an input image.

In recent years, there has been a technology capable of discriminating a composition pattern of an image captured by an imaging device such as a digital camera or the like.

For example, there has been a technology that recognizes an attention subject, recognizes the state of the attention subject, and selects a composition pattern including the attention subject from among a plurality of recorded composition patterns, on the basis of the recognized state of the attention subject. For example, an example of such a technology is disclosed in Japanese Unexamined Patent Application Publication No. 2008-81246.

In addition, there has been proposed an image processing device that detects a characteristic pattern by analyzing an input image, calculates, as an evaluation value, the degree of association between a plurality of preliminarily prepared compositions and the detected characteristic pattern, and determines the composition of the input image on the basis of the evaluation value. For example, an example of such an image processing device is disclosed in Japanese Unexamined Patent Application Publication No. 2009-159023.

Furthermore, there has been proposed a camera that extracts an edge corresponding to the upper end of a main subject in a captured image or an edge extending between two corresponding sides of a captured image, compares the position or the inclination of the extracted edge with a preliminarily defined appropriate range, and determines whether a composition is right or wrong. For example, an example of such an image processing device is disclosed in Japanese Patent No. 4029174.

SUMMARY

However, in the method of Japanese Unexamined Patent Application Publication No. 2008-81246, a high-cost operation has been necessary for recognizing a subject or recognizing the state of the attention subject.

In addition, in the method of Japanese Unexamined Patent Application Publication No. 2009-159023, since an evaluation value between a plurality of preliminarily prepared compositions and a characteristic pattern detected on the basis of the analysis of an input image is calculated with respect to each of pixels, a high-cost operation has also been necessary.

Furthermore, in the method of Japanese Patent No. 4029174, since a decision criterion for determining whether a composition is right or wrong is only based on an edge corresponding to the upper end of a main subject in a captured image or an edge extending between two corresponding sides of a captured image, the type of composition to be determined has been limited.

The present disclosure addresses the above-mentioned problems. In addition, it is desirable to classify the composition of an input image into detailed composition patterns with a lower-cost operation.

Accordingly, there is disclosed a device for processing an input image. The device may include a degree-of-symmetry calculation unit, which may be configured to receive the input image and calculate a degree of symmetry of the input image. The device may also include a parting line detection unit, which may be configured to receive the input image and detect a parting line that separates two sides of the input image. Additionally, the device may include a classification unit, which may be configured to classify the input image based on the degree of symmetry and the parting line. The classification unit may also be configured to generate a classification signal to cause at least one of display or storage of the classification.

There is also disclosed a method of processing an input image. A processor may execute a program to cause a device to perform the method. The program may be stored on a non-transitory, computer-readable storage medium. The method may include receiving the input image. Additionally, the method may include calculating a degree of symmetry of the input image. The method may also include detecting a parting line that separates two sides of the input image. In addition, the method may include classifying the input image based on the degree of symmetry and the parting line. The method may also include generating a classification signal to cause at least one of display or storage of the classification.

BRIEF DESCRIPTION OF THE DRAWINGS

FIG. 10 is a diagram explaining a composition pattern usually recommended in a photo shoot or the like;

FIG. 36 is a diagram explaining an example of a composition pattern into which a composition of an input image is classified;

FIG. 44 is a diagram explaining a display example of the recommendation of composition;

FIG. 45 is a diagram explaining a display example of the recommendation of composition.

DETAILED DESCRIPTION OF EMBODIMENTS

Hereinafter, embodiments of the presently disclosed technology will be described with reference to figures.

[Example of Configuration on Image Processing Device]

Figure 1:
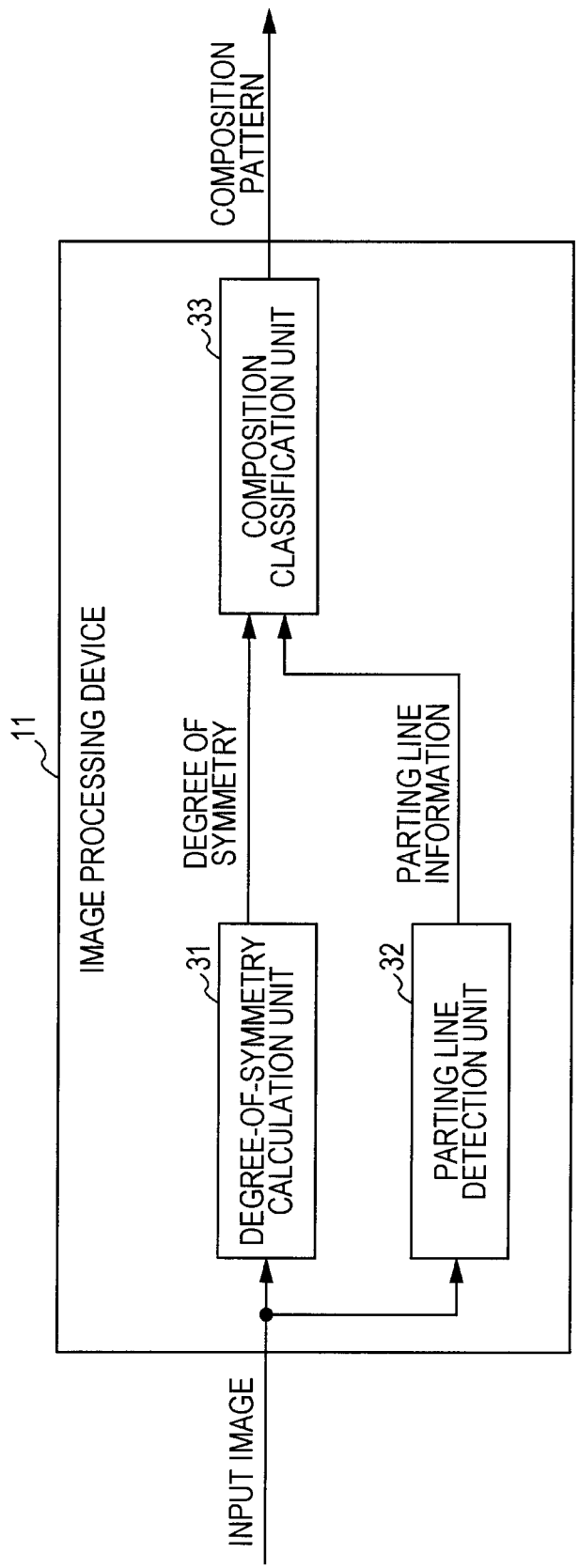
FIG. 1 is a block diagram illustrating an example of a functional configuration of an image processing device according to an embodiment of the presently disclosed technology.

FIG. 1 illustrates an example of the functional configuration of an image processing device according to an embodiment of the presently disclosed technology.

For example, an image processing device 11 in FIG. 1 calculates the degree of symmetry indicating the line symmetry of an input image input from an imaging device such as a digital camera or the like or another image processing device, and detects a parting line partitioning the input image into predetermined domains. In addition, the image processing device 11 classifies the composition of the input image into predetermined composition patterns (i.e., classifications) on the basis of at least one of the degree of symmetry and the parting line.

The image processing device 11 includes a degree-of-symmetry calculation unit 31, a parting line detection unit 32, and a composition classification unit 33.

The input image input to the image processing device 11 is supplied to the degree-of-symmetry calculation unit 31 and the parting line detection unit 32.

The degree-of-symmetry calculation unit 31 calculates the degree of symmetry indicating the line symmetry of the pixel information (pixel value) of each of pixels in the input image, with respect to each of the left-right direction and the up-down direction of the input image, and supplies the degree of symmetry to the composition classification unit 33.

[Example of Functional Configuration of Degree-of-Symmetry Calculation Unit]

Figure 2:
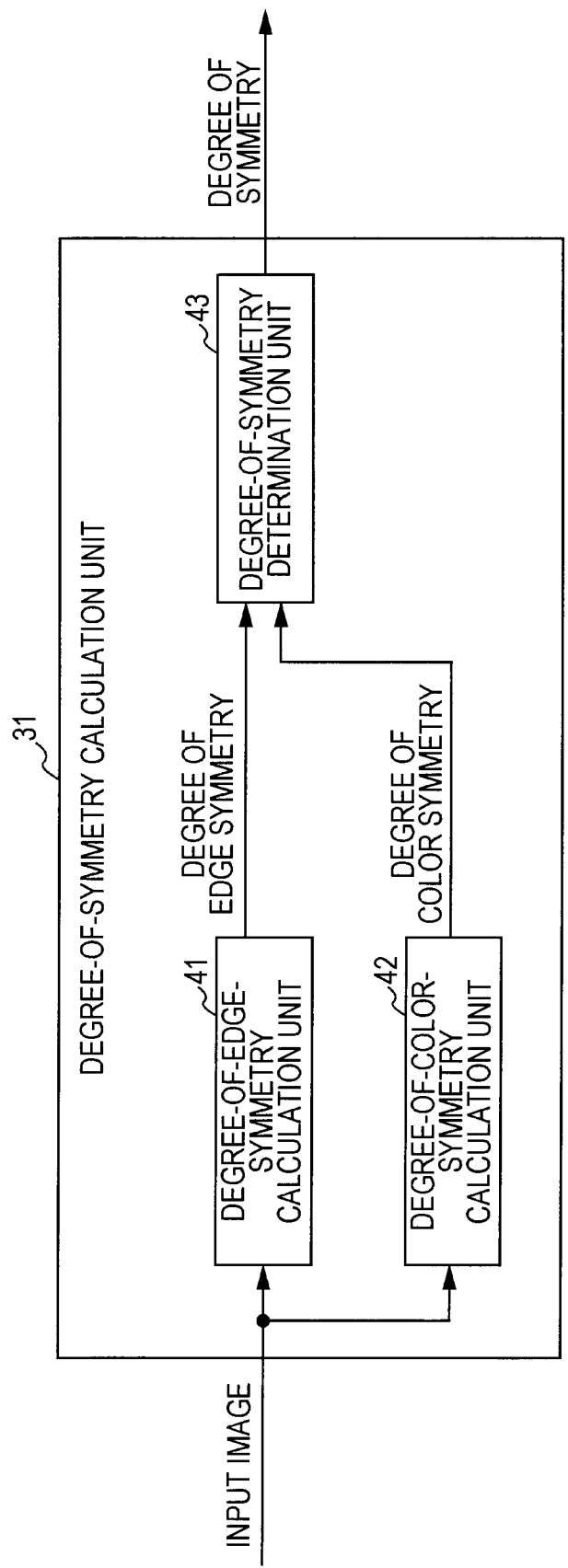
FIG. 2 is a block diagram illustrating an example of a functional configuration of a degree-of-symmetry calculation unit (i.e., a software module, a hardware module, or a combination of a software module and a hardware module)

FIG. 2 illustrates an example of the functional configuration of the degree-of-symmetry calculation unit 31.

The degree-of-symmetry calculation unit 31 includes a degree-of-edge-symmetry calculation unit 41, a degree-of-color-symmetry calculation unit 42, and a degree-of-symmetry determination unit 43.

The degree-of-edge-symmetry calculation unit 41 calculates the degree of symmetry (hereinafter, referred to as the degree of edge symmetry) of edge information that is a type of pixel information of each of pixels in the input image, and supplied the degree of symmetry to the degree-of-symmetry determination unit 43.

[Example of Functional Configuration of Degree-of-Edge-Symmetry Calculation Unit]

Figure 3:
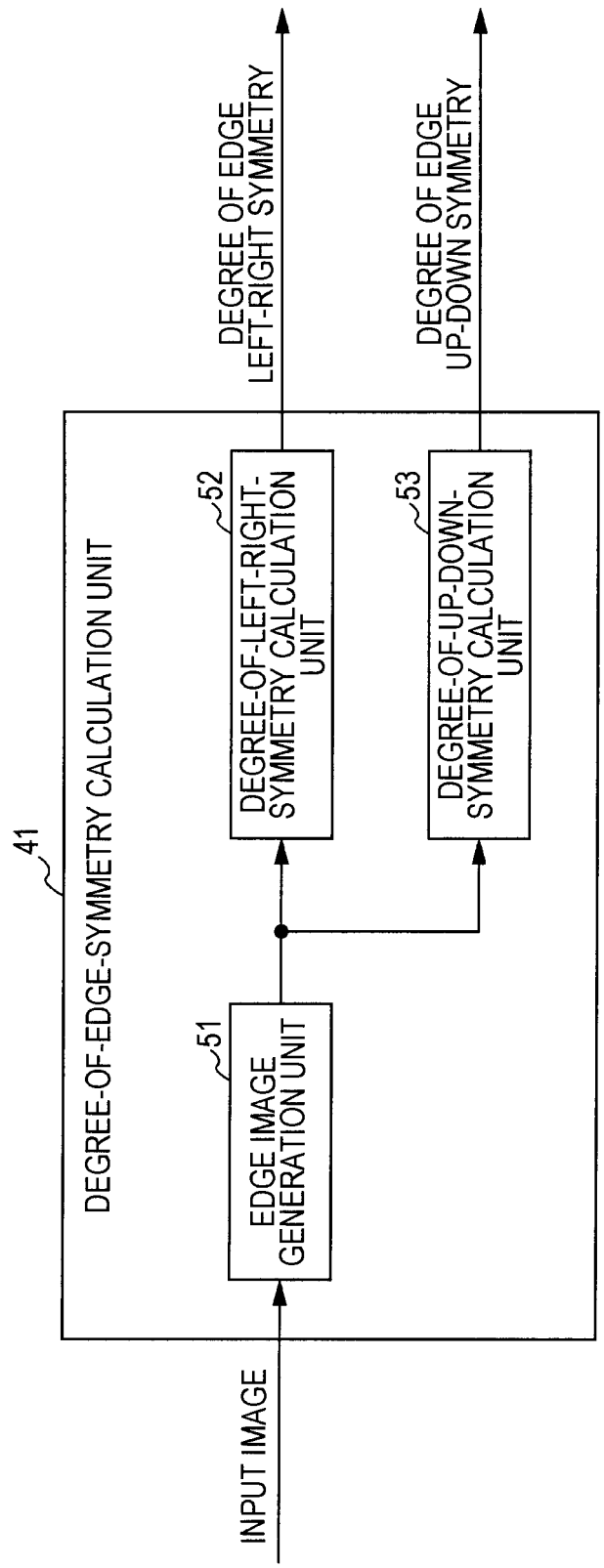
FIG. 3 is a block diagram illustrating an example of a functional configuration of a degree-of-edge-symmetry calculation unit.

FIG. 3 illustrates an example of the functional configuration of the degree-of-edge-symmetry calculation unit 41.

The degree-of-edge-symmetry calculation unit 41 includes an edge image generation unit 51, a degree-of-left-right-symmetry calculation unit 52 (i.e., a first degree-of-edge-symmetry calculation unit), and a degree-of-up-down-symmetry calculation unit 53 (i.e., a second degree-of-edge-symmetry calculation unit).

The edge image generation unit 51 generates an edge image including the edge information of each of pixels in the input image (i.e., an edge image that indicates edges of the input image), on the basis of each of the pixels, and supplies the edge image to the degree-of-left-right-symmetry calculation unit 52 and the degree-of-up-down-symmetry calculation unit 53.

The degree-of-left-right-symmetry calculation unit 52 calculates the degree of edge left-right symmetry that is the degree of symmetry of edge information, with respect to a center line in a left-right direction in the edge image (i.e., a first imaginary line in the edge image that is parallel to a side of the edge image) supplied from the edge image generation unit 51, and outputs the degree of edge left-right symmetry.

The degree-of-up-down-symmetry calculation unit 53 calculates the degree of edge up-down symmetry that is the degree of symmetry of edge information, with respect to a center line in an up-down direction in the edge image (i.e., a second imaginary line in the edge image that is perpendicular to the first imaginary line) supplied from the edge image generation unit 51, and outputs the degree of edge up-down symmetry.

In this way, the degree-of-edge-symmetry calculation unit 41 supplies, as the degree of edge symmetry, the degree of edge left-right symmetry and the degree of edge up-down symmetry to the degree-of-symmetry determination unit 43.

Returning to the description of FIG. 2, the degree-of-color-symmetry calculation unit 42 calculates the degree of symmetry (hereinafter, referred to as the degree of color symmetry) of color information that is a type of pixel information of each of pixels in the input image, and supplied the degree of symmetry to the degree-of-symmetry determination unit 43.

[Example of Functional Configuration of Degree-of-Color-Symmetry Calculation Unit]

Figure 4:
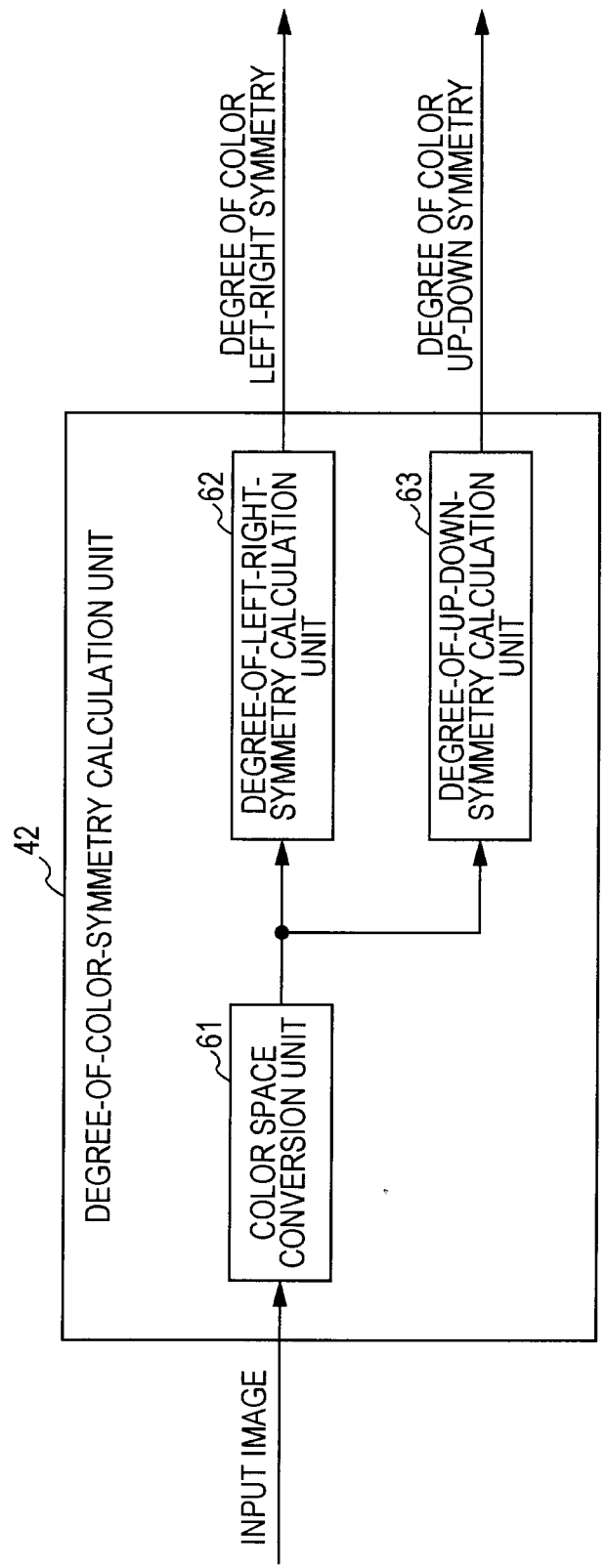
FIG. 4 is a block diagram illustrating an example of a functional configuration of a degree-of-color-symmetry calculation unit.

FIG. 4 illustrates an example of the functional configuration of the degree-of-color-symmetry calculation unit 42.

The degree-of-color-symmetry calculation unit 42 includes a color space conversion unit 61, a degree-of-left-right-symmetry calculation unit 62 (i.e., a first degree-of-color-symmetry calculation unit), and a degree-of-up-down-symmetry calculation unit 63 (i.e., a second degree-of-color-symmetry calculation unit).

The color space conversion unit 61 converts, into another color space, a color space in which the pixel information (color information) of each of pixels in the input image is represented, and supplies, to the degree-of-left-right-symmetry calculation unit 62 and the degree-of-up-down-symmetry calculation unit 63, the input image including color information represented in the converted color space.

The degree-of-left-right-symmetry calculation unit 62 calculates the degree of color left-right symmetry that is the degree of symmetry of color information, with respect to a center line in a left-right direction in the input image (i.e., a first imaginary line in the input image that is parallel to a side of the input image) supplied from the color space conversion unit 61, and outputs the degree of color left-right symmetry.

The degree-of-up-down-symmetry calculation unit 63 calculates the degree of color up-down symmetry that is the degree of symmetry of color information, with respect to a center line in an up-down direction in the input image (i.e., a second imaginary line in the input image that is perpendicular to the first imaginary line) supplied from the color space conversion unit 61, and outputs the degree of color up-down symmetry.

In this way, the degree-of-color-symmetry calculation unit 42 supplies, as the degree of color symmetry, the degree of color left-right symmetry and the degree of color up-down symmetry to the degree-of-symmetry determination unit 43.

Returning to the description of FIG. 2, on the basis of the degree of edge symmetry supplied from the degree-of-edge-symmetry calculation unit 41 and the degree of color symmetry supplied from the degree-of-color-symmetry calculation unit 42, the degree-of-symmetry determination unit 43 determines the degree of left-right symmetry indicating line symmetry with respect to the left-right direction of the input image and the degree of up-down symmetry indicating line symmetry with respect to the up-down direction of the input image. Specifically, the degree-of-symmetry determination unit 43 determines, as the degree of left-right symmetry, one of the degree of edge left-right symmetry supplied, as the degree of edge symmetry, from the degree-of-edge-symmetry calculation unit 41 and the degree of color left-right symmetry supplied, as the degree of color symmetry, from the degree-of-color-symmetry calculation unit 42, the determined one satisfying a predetermined condition. In addition, the degree-of-symmetry determination unit 43 determines, as the degree of up-down symmetry, one of the degree of edge up-down symmetry supplied, as the degree of edge symmetry, from the degree-of-edge-symmetry calculation unit 41 and the degree of color up-down symmetry supplied, as the degree of color symmetry, from the degree-of-color-symmetry calculation unit 42, the determined one satisfying a predetermined condition.

In this way, the degree-of-symmetry calculation unit 31 supplies, as the degree of symmetry, the degree of left-right symmetry and the degree of up-down symmetry to the composition classification unit 33.

Returning to the description of FIG. 1, the parting line detection unit 32 detects a parting line for partitioning the input image, from a variation in the distribution of pixel information in the input image, and supplies parting line information indicating the detected parting line to the composition classification unit 33.

[Example of Functional Configuration of Parting Line Detection Unit]

Figure 5:
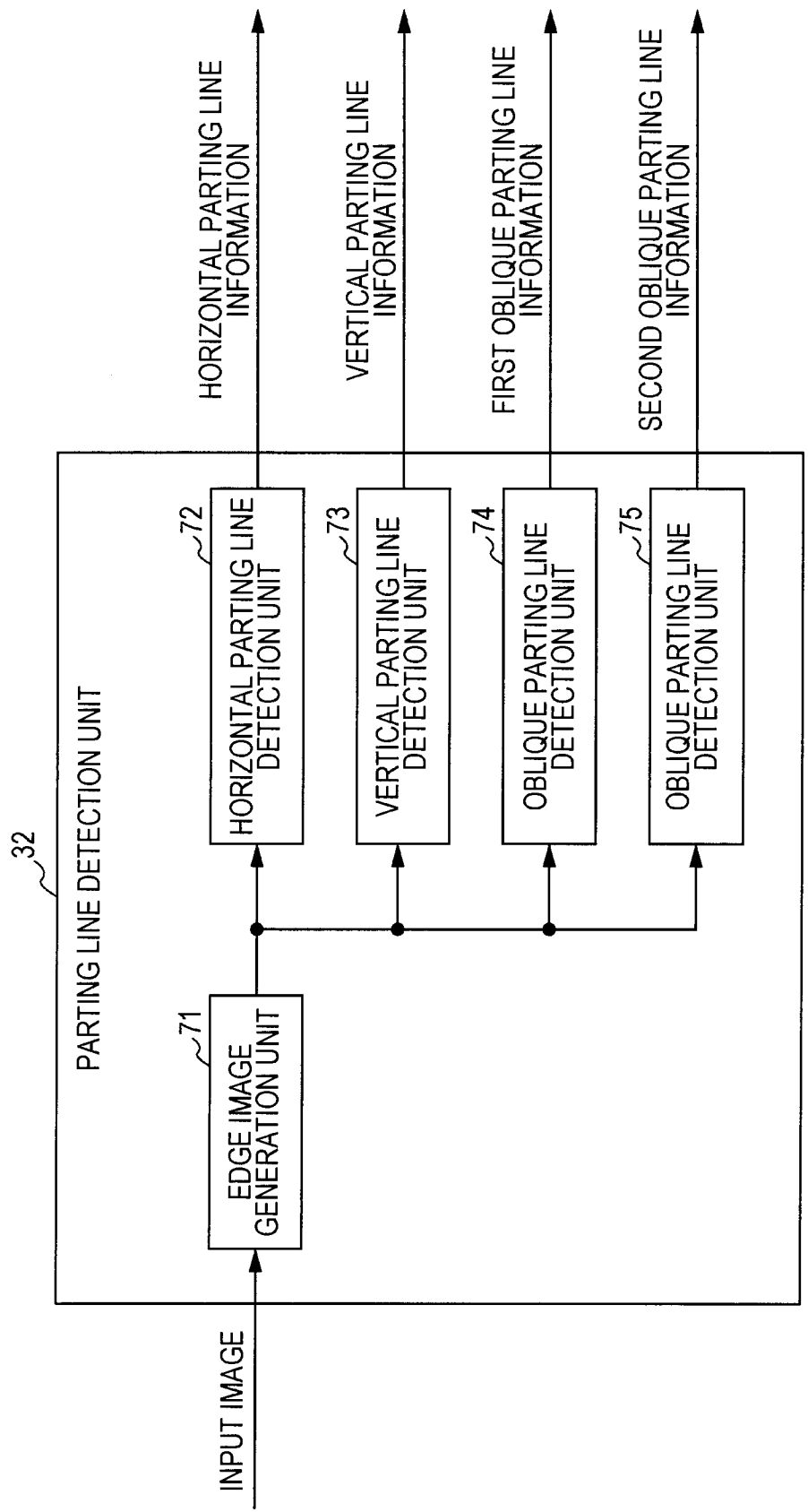
FIG. 5 is a block diagram illustrating an example of a functional configuration of a parting line detection unit.

FIG. 5 illustrates an example of the functional configuration of the parting line detection unit 32.

The parting line detection unit 32 includes an edge image generation unit 71, a horizontal parting line detection unit 72 (i.e., a first parting line detection unit), a vertical parting line detection unit 73 (i.e., a second parting line detection unit), and oblique parting line detection units 74 and 75 (i.e., third and fourth parting line detection units).

In the same way as the edge image generation unit 51 in FIG. 3, the edge image generation unit 71 generates an edge image including the edge information of each of pixels in the input image, on the basis of each of the pixels, and supplies the edge image to the horizontal parting line detection unit 72 to the oblique parting line detection unit 75.

The horizontal parting line detection unit 72 integrates the edge information in a horizontal direction in the edge image supplied from the edge image generation unit 71, and detects a horizontal parting line (i.e., a first parting line) partitioning the input image in the horizontal direction (namely, into up and down), from the distribution of the integration value thereof. The horizontal parting line detection unit 72 outputs horizontal parting line information indicating the detected horizontal parting line.

The vertical parting line detection unit 73 integrates the edge information in a vertical direction in the edge image supplied from the edge image generation unit 71, and detects a vertical parting line (i.e., a second parting line that is angled with respect to the first parting line) partitioning the input image in the vertical direction (namely, into right and left), from the distribution of the integration value thereof. The vertical parting line detection unit 73 outputs vertical parting line information indicating the detected vertical parting line.

The oblique parting line detection unit 74 integrates the edge information in an upper right oblique direction in the edge image supplied from the edge image generation unit 71, and detects an upper right oblique parting line (i.e., a third parting line that is angled with respect to the first and second parting lines) partitioning the input image in the upper right oblique direction, from the distribution of the integration value thereof. The oblique parting line detection unit 74 outputs first oblique parting line information indicating the detected upper right oblique parting line.

The oblique parting line detection unit 75 integrates the edge information in an upper left oblique direction in the edge image supplied from the edge image generation unit 71, and detects an upper left oblique parting line (i.e., a fourth parting line that is angled with respect to the first, second, and third parting lines) partitioning the input image in the upper left oblique direction, from the distribution of the integration value thereof. The oblique parting line detection unit 75 outputs second oblique parting line information indicating the detected upper left oblique parting line.

In this way, as the parting line information, the parting line detection unit 32 supplies the horizontal parting line information, the vertical parting line information, the first oblique parting line information, and the second oblique parting line information to the composition classification unit 33.

Figure 6:
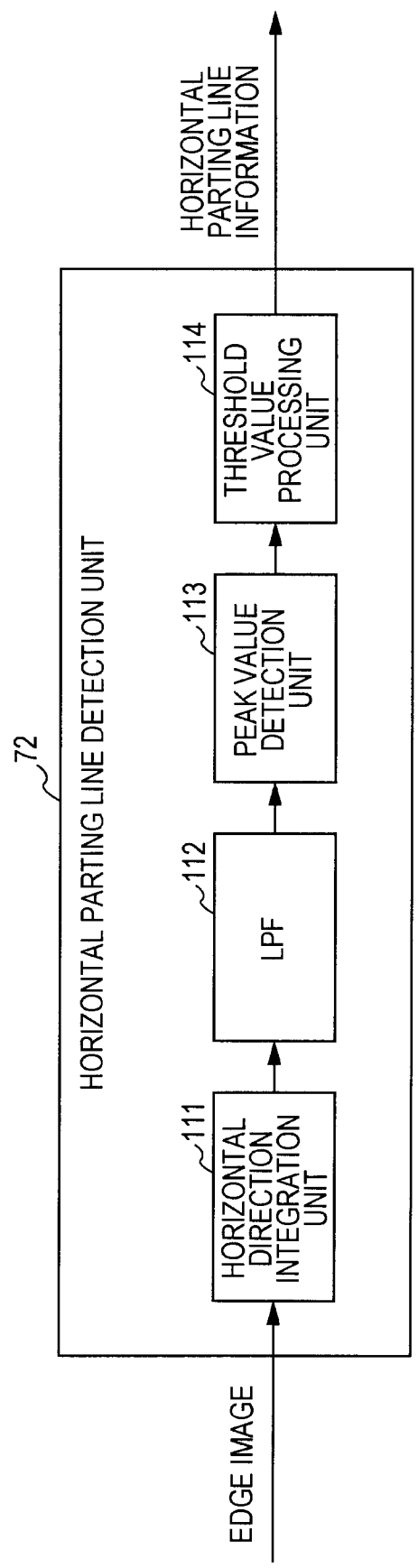
FIG. 6 is a block diagram illustrating an example of a functional configuration of a horizontal parting line detection unit.
Figure 7:
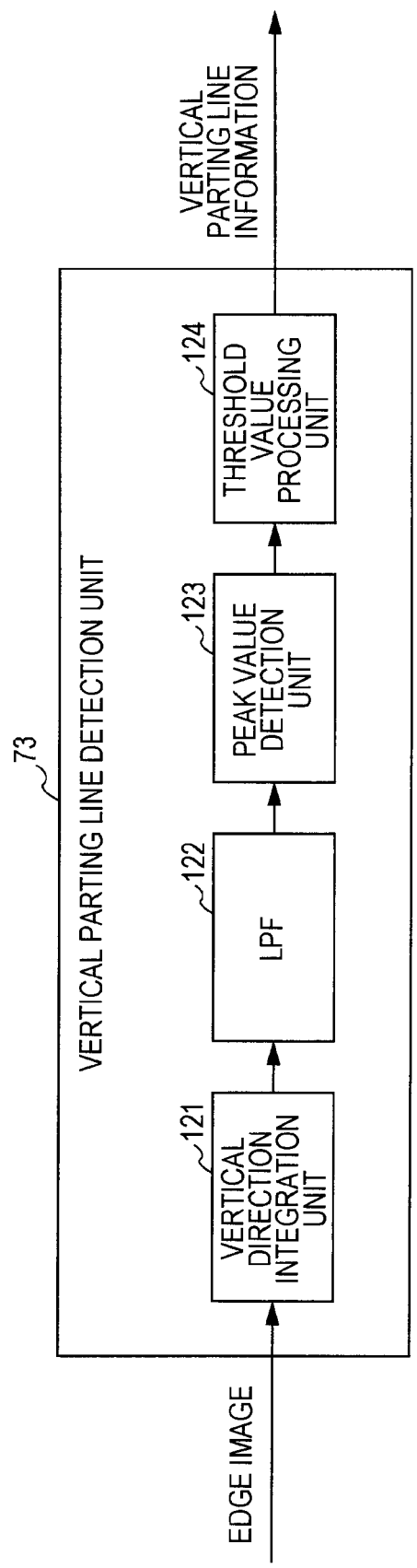
FIG. 7 is a block diagram illustrating an example of a functional configuration of a vertical parting line detection unit.
Figure 8:
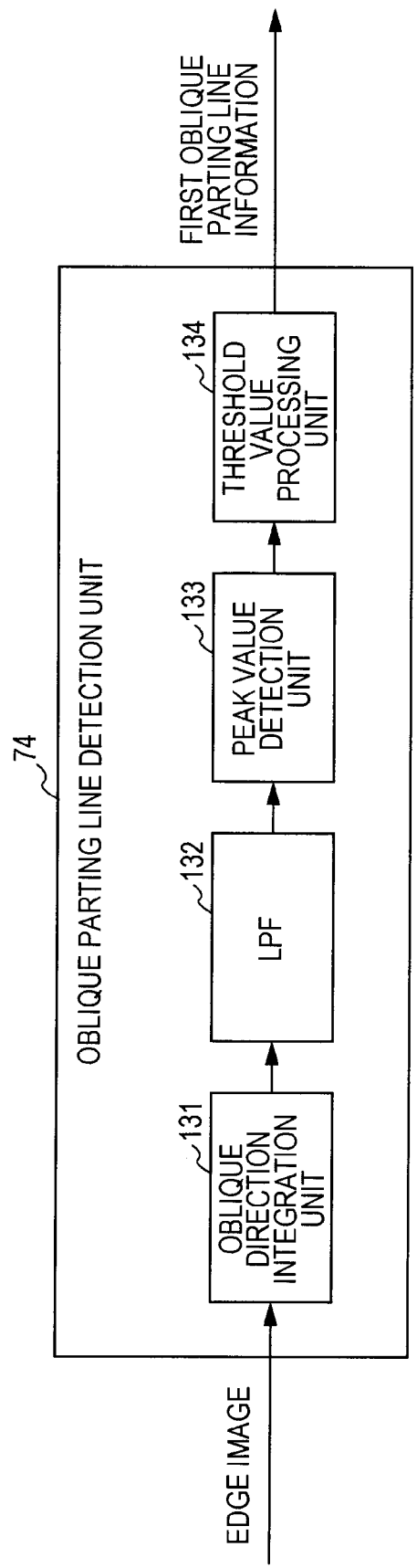
FIG. 8 is a block diagram illustrating an example of a functional configuration of an oblique parting line detection unit.

Here, with reference to FIGS. 6 to 8, examples of the functional configurations of the horizontal parting line detection unit 72 to the oblique parting line detection unit 75 are illustrated.

[Example of Functional Configuration of Horizontal Parting Line Detection Unit]

FIG. 6 illustrates an example of the functional configuration of the horizontal parting line detection unit 72.

The horizontal parting line detection unit 72 includes a horizontal direction integration unit 111, a low pass filter (LPF) 112, a peak value detection unit 113, and a threshold value processing unit 114.

The horizontal direction integration unit 111 integrates the pixel information (edge information) of a pixel, with respect to each of lines including pixels (hereinafter, simply referred to as line) in the horizontal direction in the edge image supplied from the edge image generation unit 71, and supplies the integration result thereof to the LPF 112. The integration result obtained here is the integration value of the edge information in the horizontal direction, with respect to a pixel position in the vertical direction in the edge image (input image).

By performing filtering processing on the integration result from the horizontal direction integration unit 111, namely, the integration value of the edge information in the horizontal direction with respect to a pixel position in the vertical direction in the edge image, the LPF 112 removes noise from the integration result, and supplies the integration result to the peak value detection unit 113.

The peak value detection unit 113 detects the peak value of the integration value from the integration result from which noise is removed by the LPF 112, and supplies to the threshold value processing unit 114 the detected peak value and the pixel position in the vertical direction of the line in the horizontal direction from which the integration value to be the peak value is obtained.

The threshold value processing unit 114 compares the peak value from the peak value detection unit 113 with a predetermined threshold value. In addition, when the peak value is greater than the predetermined threshold value, the threshold value processing unit 114 defines, as the horizontal parting line, the line in the horizontal direction from which the integration value to be the peak value is obtained, and outputs, as the horizontal parting line information, the pixel position in the vertical direction of the line in the edge image.

[Example of Functional Configuration of Vertical Parting Line Detection Unit]

FIG. 7 illustrates an example of the functional configuration of the vertical parting line detection unit 73.

The vertical parting line detection unit 73 includes a vertical direction integration unit 121, an LPF 122, a peak value detection unit 123, and a threshold value processing unit 124.

The vertical direction integration unit 121 integrates the edge information with respect to each of lines in the vertical direction in the edge image supplied from the edge image generation unit 71, and supplies the integration result thereof to the LPF 122. The integration result obtained here is the integration value of the edge information in the vertical direction, with respect to a pixel position in the horizontal direction in the edge image (input image).

By performing filtering processing on the integration result from the vertical direction integration unit 121, namely, the integration value of the edge information in the vertical direction with respect to a pixel position in the horizontal direction in the edge image, the LPF 122 removes noise from the integration result, and supplies the integration result to the peak value detection unit 123.

The peak value detection unit 123 detects the peak value of the integration value from the integration result from which noise is removed by the LPF 122, and supplies to the threshold value processing unit 124 the detected peak value and the pixel position in the horizontal direction of the line in the vertical direction from which the integration value to be the peak value is obtained.

The threshold value processing unit 124 compares the peak value from the peak value detection unit 123 with a predetermined threshold value. In addition, when the peak value is greater than the predetermined threshold value, the threshold value processing unit 124 defines, as the vertical parting line, the line in the vertical direction from which the integration value to be the peak value is obtained, and outputs, as the vertical parting line information, the pixel position in the horizontal direction of the line in the edge image.

[Example of Functional Configuration of Oblique Parting Line Detection Unit]

FIG. 8 illustrates an example of the functional configuration of the oblique parting line detection unit 74.

The oblique parting line detection unit 74 includes an oblique direction integration unit 131, an LPF 132, a peak value detection unit 133, and a threshold value processing unit 134.

The oblique direction integration unit 131 integrates the edge information, with respect to each of lines in the upper right oblique direction in the edge image supplied from the edge image generation unit 71, and supplies the integration result thereof to the LPF 132. The integration result obtained here is the integration value of the edge information in the upper right oblique direction, with respect to a pixel position in the upper left oblique direction in the edge image (input image).

By performing filtering processing on the integration result from the oblique direction integration unit 131, namely, the integration value of the edge information in the upper right oblique direction with respect to a pixel position in the upper left oblique direction in the edge image, the LPF 132 removes noise from the integration result, and supplies the integration result to the peak value detection unit 133.

The peak value detection unit 133 detects the peak value of the integration value from the integration result from which noise is removed by the LPF 132, and supplies to the threshold value processing unit 134 the detected peak value and the pixel position in the upper left oblique direction of the line in the upper right oblique direction from which the integration value to be the peak value is obtained.

The threshold value processing unit 134 compares the peak value from the peak value detection unit 133 with a predetermined threshold value. In addition, when the peak value is greater than the predetermined threshold value, the threshold value processing unit 114 defines, as the upper right oblique parting line, the line in the upper right oblique from which the integration value to be the peak value is obtained, and outputs, as first parting line information, the pixel position in the upper left oblique direction of the line in the edge image.

In addition, an example of the functional configuration of the oblique parting line detection unit 75 is basically the same as that of the oblique parting line detection unit 74 in FIG. 8, with the exception that, in individual units of the oblique parting line detection unit 74, processing for the upper right oblique direction of the edge information is replaced with processing for the upper left oblique direction of the edge information. Therefore, the description thereof will be omitted.

In addition, returning to the description of FIG. 1, the composition classification unit 33 classifies the composition of the input image into one of preliminarily defined composition patterns, on the basis of the degree of symmetry from the degree-of-symmetry calculation unit 31 and the parting line information from the parting line detection unit 32, and outputs the composition pattern, along with the degree of symmetry and the parting line information, to an information processing device, a storage device, or the like, not illustrated.

[Composition Classification Processing Performed in Image Processing Device]

Next, composition classification processing performed in the image processing device 11 in FIG. 1 will be described with reference to a flowchart in FIG. 9.

Figure 9:
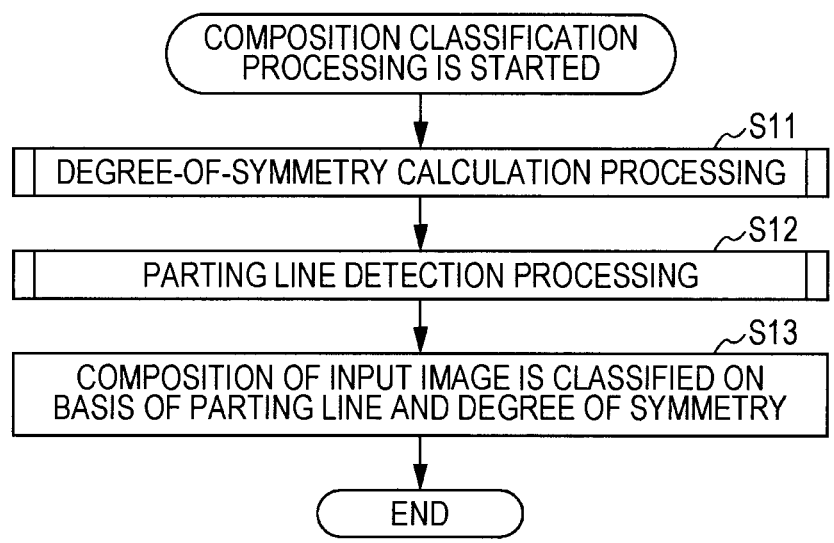
FIG. 9 is a flowchart explaining composition classification processing.

The composition of an input image input to the image processing device 11 is classified into one of preliminarily defined composition patterns, on the basis of composition classification processing illustrated in the flowchart in FIG. 9.

Here, a composition pattern usually recommended in a photo shoot or the like will be described with reference to FIG. 10.

Figure 10:
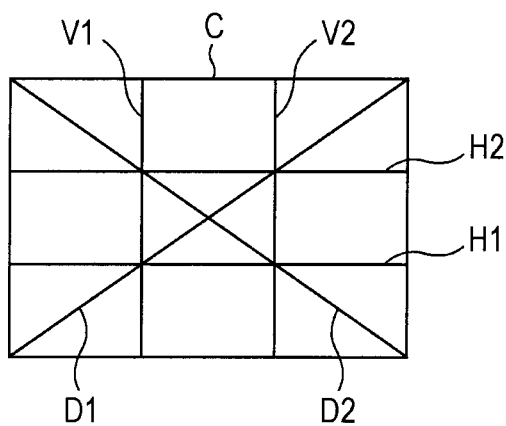

A composition pattern C illustrated in FIG. 10 includes two representative composition patterns such as composition based on the Rule of Thirds and diagonal composition.

The composition based on the Rule of Thirds is composition including horizontal parting lines H1 and H2 and vertical parting lines V1 and V2, called tripartition lines. In addition, the boundary of a subject or a landscape is positioned on at least one line of the horizontal parting lines H1 and H2 and the vertical parting lines V1 and V2, or a subject is positioned at one of four intersection points (tripartition line intersection points) between the horizontal parting lines H1 and H2 and the vertical parting lines V1 and V2, thereby allowing a well-balanced image to be obtained.

In addition, the diagonal composition is composition including diagonal lines D1 and D2, and the boundary of a subject or a landscape is positioned on at least one line of the diagonal lines D1 and D2, thereby allowing a well-balanced image to be obtained.

In the composition classification processing described hereinafter, it is determined how symmetric the composition of an input image is with respect to a left-right direction or an up-down direction or which of the above-mentioned composition based on the Rule of Thirds or diagonal composition the composition of an input image is similar to.

In Step S11 in the flowchart in FIG. 9, the degree-of-symmetry calculation unit 31 executes degree-of-symmetry calculation processing, and calculates the degree of symmetry of the pixel information of each of pixels in the input image, with respect to each of the left-right direction and the up-down direction of the input image.

[Degree-of-Symmetry Calculation Processing Performed in Degree-of-Symmetry Calculation Unit]

Here, the degree-of-symmetry calculation processing performed in Step S11 in the flowchart in FIG. 9 will be described with reference to a flowchart in FIG. 11.

In Step S31, the degree-of-edge-symmetry calculation unit 41 in the degree-of-symmetry calculation unit 31 executes degree-of-edge-symmetry calculation processing, and calculates the degree of edge symmetry of the input image.

[Degree-of-Edge-Symmetry Calculation Processing Performed in Degree-of-Edge-Symmetry Calculation Unit]

Here, the degree-of-edge-symmetry calculation processing performed in Step S31 in the flowchart in FIG. 11 will be described with reference to a flowchart in FIG. 12.

In Step S41, the edge image generation unit 51 in the degree-of-edge-symmetry calculation unit 41 acquires a luminance image from the input image, and generates an edge image that includes an edge value (edge information) obtained by applying an edge extraction filter such as a Sobel filter, a Gabor filter, or the like to the luminance image.

In addition, the edge image generation unit 51 may acquire color channel images such as R, G, B and the like from the input image, compare edge values, obtained by individually applying the edge extraction filter to the color channel images, with one another between channels with respect to each pixel, and generate an edge image including individual maximum values.

Furthermore, the edge image generation unit 51 may also perform the region partitioning of a color, which utilizes a mean shift algorithm (Mean Shift method) or the like, on the input image, and generate an edge image by assigning an edge value to a pixel on the boundary line of a partitioned region. For example, in this case, an edge value "1" is assigned to a pixel on the boundary line of a region, and an edge value "0" is assigned to a pixel in a region other than the boundary line.

Figure 13:
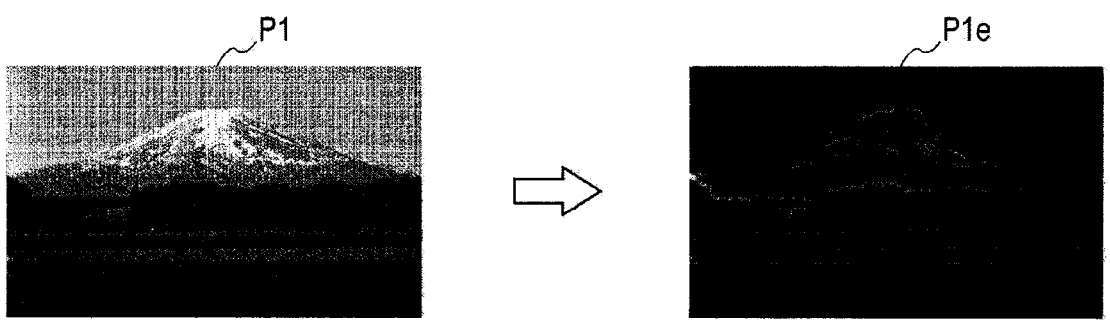
FIG. 13 is a diagram explaining an input image and an edge image.

For example, when, as illustrated in FIG. 13, a scenery image in which a subject is a mountain is input as an input image P1, the edge image generation unit 51 generates an edge image P1e that indicates the profile shape of a scene including the mountain. The edge image P1e generated in this way is supplied to the degree-of-left-right-symmetry calculation unit 52 and the degree-of-up-down-symmetry calculation unit 53.

In Step S42, the degree-of-left-right-symmetry calculation unit 52 calculates the degree of edge left-right symmetry that is the degree of left-right symmetry of the edge image, on the basis of the edge image supplied from the edge image generation unit 51.

Figure 14:
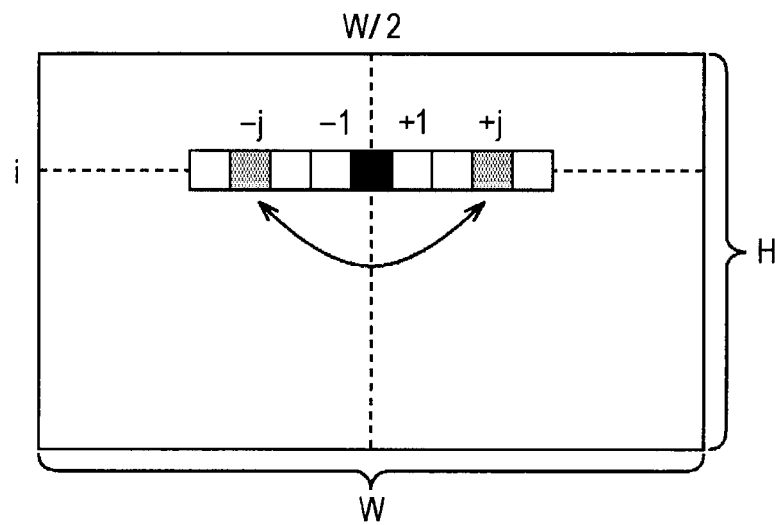
FIG. 14 is a diagram explaining an example of calculation of a degree of edge left-right symmetry.

Here, an example of the calculation of the degree of edge left-right symmetry will be described with reference to FIG. 14. FIG. 14 illustrates the edge image P1e.

As illustrated in FIG. 14, if the edge image P1e includes H×W pixels, a center line in a left-right direction in the edge image P1e is a line located at a pixel position W/2.

In addition, attention is focused on a line in the horizontal direction, the pixel position in an up-down direction of which is "i", and it is assumed that the pixel position of a pixel located j pixels away on the right side from a pixel (a pixel whose pixel position is W/2) on the center line in the left-right direction is represented by "+j" and the pixel position of a pixel located j pixels away on the left side from the pixel on the center line in the horizontal direction is represented by "−j".

At this time, in the edge image P1e, the sum d of a difference between pieces of edge information of a pair of pixels located on opposite sides of the center line in the left-right direction (the pixel position thereof is W/2), the pixel positions of the pair of pixels being pixel positions (i, j) and (i, −j) (hereinafter, simply referred to as pixel position (i, j)), and the sum s of pieces of edge information of the pairs of pixels located on opposite sides of the center line in the left-right direction (namely, the sum of pieces of edge information of all pixels) are indicated by the following Expressions (1) and (2), respectively.

$$d = \frac{\sum_{i=0}^{H-1}\sum_{j=1}^{W/2-1} |I(W/2-j) - I(W/2+j)| \cdot w}{\sum w} \quad (1)$$

$$s = \frac{\sum_{i=0}^{H-1}\sum_{j=1}^{W/2-1} \{I(W/2-j) + I(W/2+j)\} \cdot w}{\sum w} \quad (2)$$

In Expressions (1) and (2), a coefficient w is a weighting coefficient whose weighting decreases with an increase in the distance of the pixel position (i, j) of an attention pixel from the center point of the input image, the pixel position (i, j) being defined with respect to the center of the edge image, and when the distance of the pixel position (i, j) from the center point of the input image is indicated by r, the coefficient w is indicated by the following Expression (3).

$$w = \exp\left(-\frac{r^2}{\sigma^2}\right) \quad (3)$$

In addition, it is assumed that a constant σ in Expression (3) is an arbitrarily set value.

The "sum of differences between pieces of edge information" d indicated by Expression (1) has a value approaching "0" with increase in the left-right symmetry of the edge image P1e, and the "sum of differences between pieces of edge information" d has a value approaching the "sum of pieces of edge information" s with increase in the left-right asymmetry of the edge image P1e. Therefore, the degree of edge left-right symmetry sym_edg_LR that is the degree of left-right symmetry of the edge image is indicated by the following Expression (4).

$$\text{sym\_edg\_LR} = 1 - \frac{d}{s} \quad (4)$$

Namely, the degree of edge left-right symmetry sym_edg_LR has a value whose range is 0<sym_edg_LR≤1, and has a value approaching "1" with increase in the left-right symmetry of the edge image P1e.

In this way, the degree of edge left-right symmetry is calculated.

Figure 12:
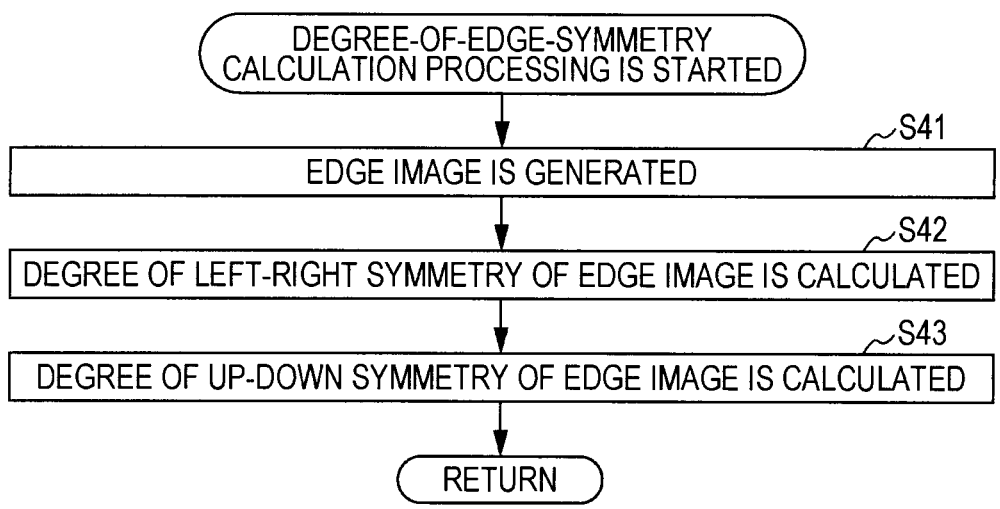
FIG. 12 is a flowchart explaining degree-of-edge-symmetry calculation processing.

Returning to the flowchart in FIG. 12, in Step S43, the degree-of-up-down-symmetry calculation unit 53 calculates the degree of edge up-down symmetry that is the degree of up-down symmetry of the edge image, on the basis of the edge image supplied from the edge image generation unit 51.

Figure 15:
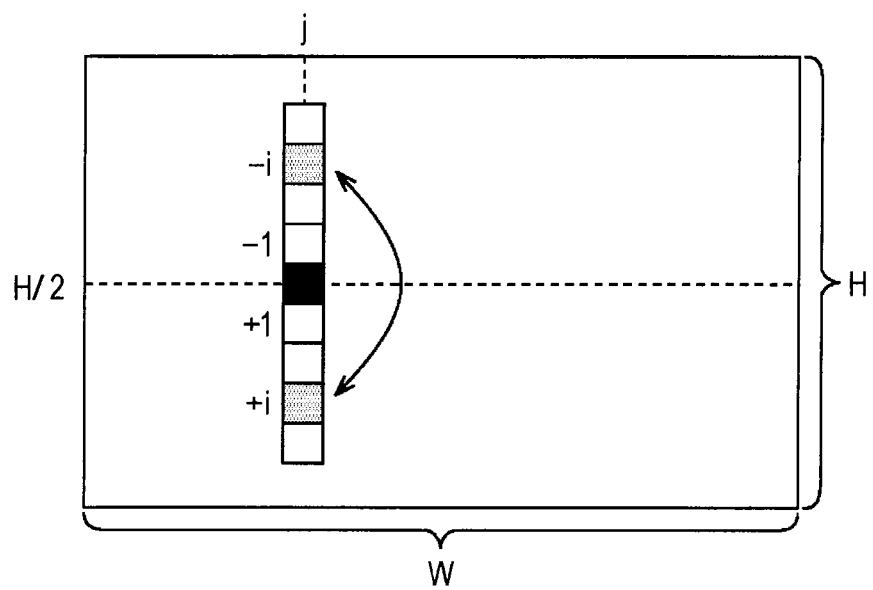
FIG. 15 is a diagram explaining an example of calculation of a degree of edge up-down symmetry.

In addition, with respect to the degree of edge up-down symmetry sym_edg_TB, as illustrated in FIG. 15, it is assumed that the center line in the up-down direction of the edge image P1e is a line whose pixel position is H/2, and attention is focused on a line including pixels in the vertical direction, located at a pixel position j in the left-right direction. In addition, when it is assumed that the pixel position of a pixel located i pixels away on the lower side from a pixel (a pixel whose pixel position is H/2) on the center line in the up-down direction is represented by "+i" and the pixel position of a pixel located i pixels away on the upper side from the pixel on the center line in the up-down direction is represented by "−i", the degree of edge up-down symmetry sym_edg_TB is calculated by replacing the value H and the value W with each other in Expressions (1) and (2), in the same way as the degree of edge left-right symmetry sym_edg_LR.

In this way, the degree of edge up-down symmetry is calculated.

Figure 11:
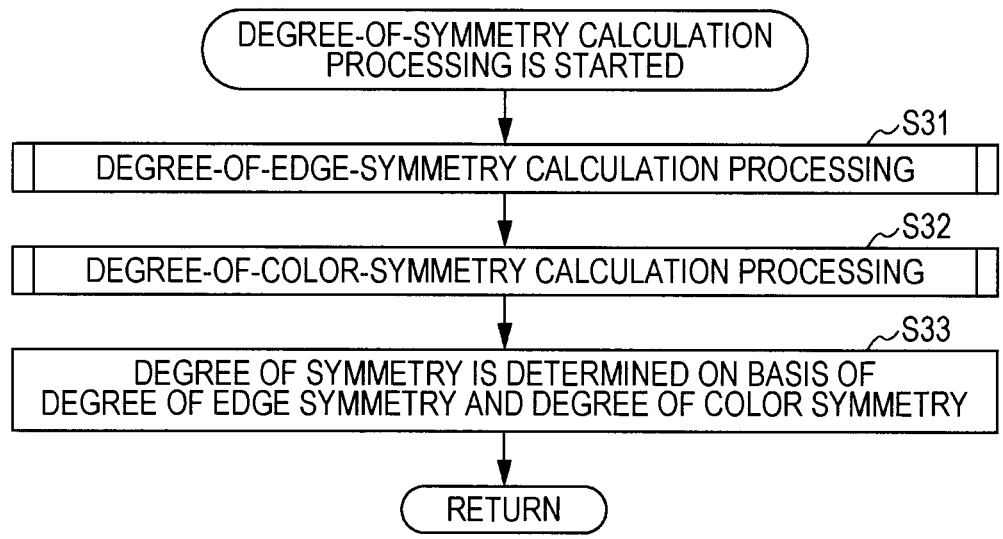
FIG. 11 is a flowchart explaining degree-of-symmetry calculation processing.

Subsequent to Step S43, the processing returns to Step S31 in the flowchart in FIG. 11, and proceeds to Step S32.

Figure 16:
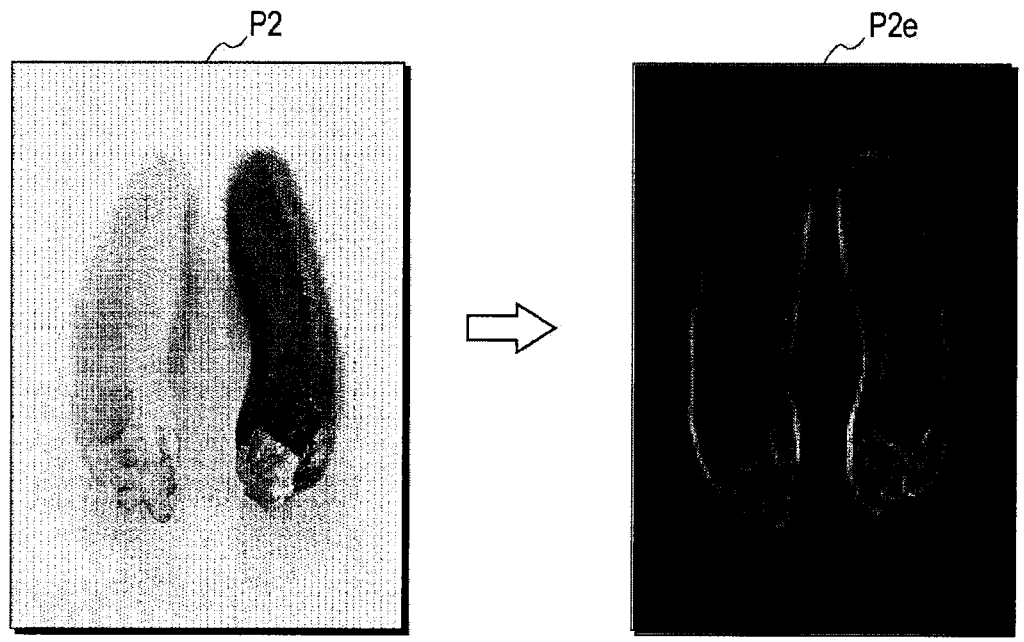
FIG. 16 is a diagram explaining an input image and an edge image.

Incidentally, when, as the input image, an input image P2 is input in which vegetables as subjects having approximately the same shape and different colors are placed side by side, as illustrated on the left side of FIG. 16, an edge image P2e illustrated on the right side of FIG. 16 is generated in the degree-of-edge-symmetry calculation processing.

Since the edge image P2e illustrated in FIG. 16 has high line symmetry with respect to the left-right direction, a great value is obtained as the degree of edge left-right symmetry. However, since the colors of the subjects placed side by side are different from each other in the actual input image P2, it is not necessarily the case that the line symmetry is high with respect to the left-right direction.

In this way, in the degree-of-edge-symmetry calculation processing, it is difficult to obtain the line symmetry of the color of the input image.

Therefore, in Step S32, the degree-of-color-symmetry calculation unit 42 executes the degree-of-color-symmetry calculation processing, and calculates the degree of color symmetry of the input image, thereby obtaining the line symmetry of the color of the input image.

[Degree-of-Color-Symmetry Calculation Processing Performed in Degree-of-Color-Symmetry Calculation Unit]

Here, the degree-of-color-symmetry calculation processing performed in Step S31 in the flowchart in FIG. 11 will be described with reference to a flowchart in FIG. 17.

In Step S51, the color space conversion unit 61 converts a color space so that individual pixels in the input image represented by an RGB space are represented by an L*a*b*space, for example. The color space conversion unit 61 supplies the input image represented by the L*a*b*space to the degree-of-left-right-symmetry calculation unit 62 and the degree-of-up-down-symmetry calculation unit 63.

In Step S52, the degree-of-left-right-symmetry calculation unit 62 calculates the degree of color left-right symmetry that is the degree of left-right symmetry of the input image whose color space is converted by the color space conversion unit 61, the input image being represented by the L*a*b*space.

Here, an example of the calculation of the degree of color left-right symmetry will be described.

In addition, it is assumed that the input image represented by the L*a*b*space is expressed in the same way as the edge image P1e described with reference to FIG. 14.

At this time, in the input image, the sum D of a color difference between a pair of pixels located on opposite sides of the center line in the left-right direction (the pixel position thereof is W/2), the pixel positions of the pair of pixels being a pixel position (i, j), is indicated by the following Expression (5).

$$D = \frac{\sum_{i=0}^{H-1} \sum_{j=1}^{W/2-1} dE(i, j) \cdot w}{\sum w} \tag{5}$$

In Expression (5), a color difference dE between pixels located at the pixel position (i, j), a difference dL between L*axis components L thereof, a difference da between a*axis components a thereof, and a difference db between b*axis components b thereof are individually indicated by the following Expression (6).

$$\begin{aligned} dE &= \sqrt{dL^2 + da^2 + db^2} \\ dL &= L(i, W/2 - j) - L(i, W/2 + j) \\ da &= a(i, W/2 - j) - a(i, W/2 + j) \\ db &= b(i, W/2 - j) - b(i, W/2 + j) \end{aligned} \tag{6}$$

In addition, a coefficient w in Expression (5) is a weighting coefficient relating to the color difference dE between pixels located at the pixel position (i, j), and the coefficient w is indicated by the following Expression (7).

$$w = w_P \cdot w_E \tag{7}$$

In Expression (7), a weighting coefficient $w_P$ is a weighting coefficient whose weighting decreases with an increase in the distance of the pixel position (i, j) from the center point of the input image, and the weighting coefficient $w_P$ is indicated by the following Expression (8).

$$w_P = \exp\left[-\beta\left\{\left(i - \frac{H}{2}\right)^2 + \left(j - \frac{W}{2}\right)^2\right\}\right] \tag{8}$$

In addition, it is assumed that a constant β in Expression (8) is an arbitrarily set value.

Figure 18:
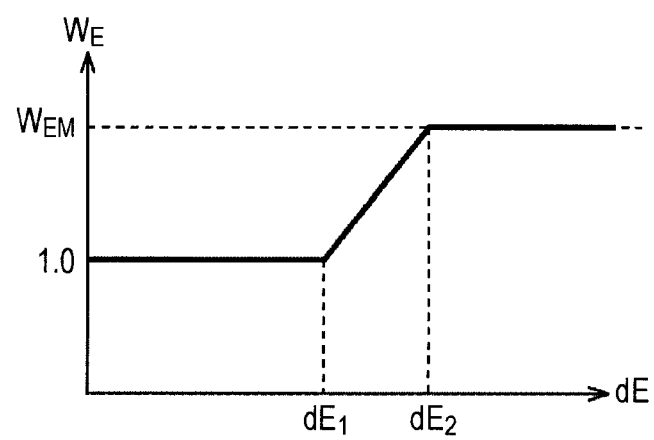
FIG. 18 is a diagram explaining a weighting coefficient based on a color difference.

In addition, in Expression (7), a weighting coefficient $w_E$ is a weighting coefficient whose weighting is higher in a region in which the color difference dE between pixels located at the attention pixel position (i, j) is larger, and the weighting coefficient $w_E$ has such a characteristic as illustrated in FIG. 18. Specifically, when the color difference dE is smaller than a value $dE_1$, the weighting coefficient $w_E$ has a value 1.0, and when the color difference dE is greater than a value $dE_2$, the weighting coefficient $w_E$ has a value $w_{EM}$. In addition, when the color difference dE ranges from the value $dE_1$ to the value $dE_2$, the weighting coefficient $w_E$ also increases in response to the increase of the color difference dE.

Namely, the weighting coefficient $w_E$ is weighted with respect to the color difference dE so that the color difference dE is more emphasized for a region whose color greatly varies from right to left in such a way as the input image P2 illustrated in FIG. 16.

Figure 19:
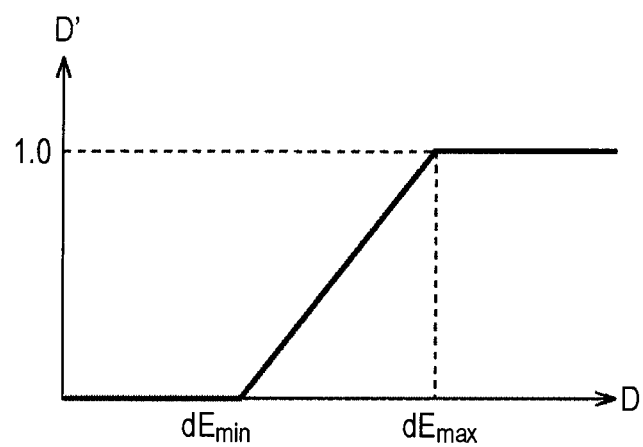
FIG. 19 is a diagram explaining the conversion of the sum of color differences.

Accordingly, while the "sum of color differences" D indicated by Expression (5) has a value that decreases with increase in the left-right symmetry of the color of the input image, and has a value that increases with increase in the left-right asymmetry of the color of the input image, the "sum of color differences" D is converted as illustrated in FIG. 19, in order to be easy to deal with.

Namely, according to FIG. 19, when the sum of color differences D is smaller than the minimum value $dE_{min}$ of the color difference dE between pixels located at the pixel position (i, j), the sum of color differences D' after the conversion has a value "0", and when the sum of color differences D is greater than the maximum value $dE_{max}$ of the color difference dE between pixels located at the pixel position (i, j), the sum of color differences D' after the conversion has a value "1". In addition, when the sum of color differences D ranges from the $dE_{min}$ to the $dE_{max}$, the sum of color differences D' after the conversion also increases in response to the increase of the sum of color differences D.

In addition, the degree of color left-right symmetry sym_col_LR that is the degree of left-right symmetry of the color of the input image is indicated by the following Expression (9).

$$\text{sym\_col\_LR} = 1 - D' \tag{9}$$

Namely, the degree of color left-right symmetry sym_col_LR has a value whose range is 0≤sym_col_LR≤1, and has a value approaching "1" with increase in the left-right symmetry of the color of the input image.

In this way, the degree of color left-right symmetry is calculated.

Figure 17:
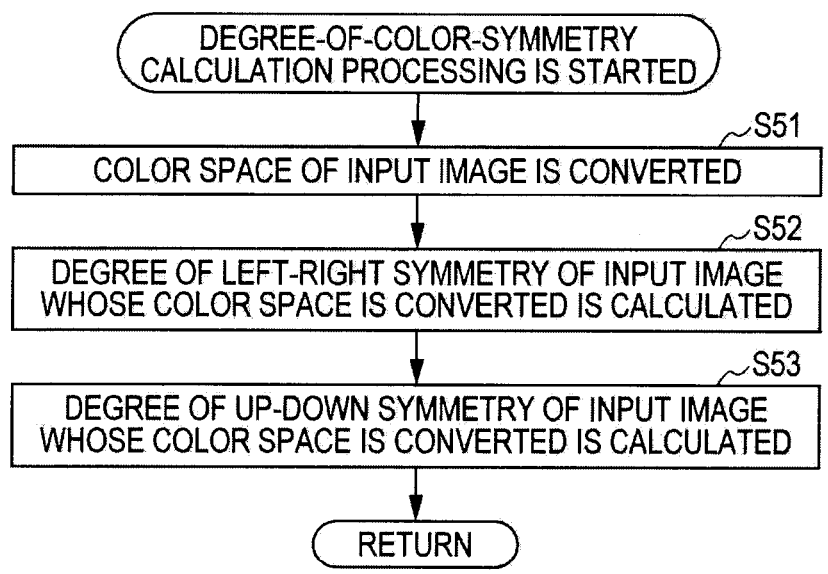
FIG. 17 is a flowchart explaining degree-of-color-symmetry calculation processing.

Returning to the flowchart in FIG. 17, in Step S53, the degree-of-up-down-symmetry calculation unit 63 calculates the degree of color up-down symmetry that is the degree of up-down symmetry of the input image whose color space is converted by the color space conversion unit 61, the input image being represented by the L*a*b*space.

In addition, with respect to the degree of color up-down symmetry sym_col_TB, in the same way as the edge image P1e illustrated in FIG. 15, it is assumed that the center line in the up-down direction of the input image is a line whose pixel position is H/2, and attention is focused on a line in the vertical direction, located at the pixel position j in the left-right direction. In addition, when it is assumed that the pixel position of a pixel located i pixels away on the lower side from a pixel (a pixel whose pixel position is H/2) on the center line in the up-down direction is represented by "+i" and the pixel position of a pixel located i pixels away on the upper side from the pixel on the center line in the up-down direction is represented by "−i", the degree of edge up-down symmetry sym_edg_TB is calculated by replacing the value H and the value W with each other in Expressions (5) and (6), in the same way as the degree of color left-right symmetry sym_col_LR.

In this way, the degree of color up-down symmetry is calculated.

Subsequent to Step S53, the processing returns to Step S32 in the flowchart in FIG. 11, and proceeds to Step S33.

In Step S33, the degree-of-symmetry determination unit 43 determines the degree of left-right symmetry and the degree of up-down symmetry of the input image on the basis of the degree of edge symmetry supplied from the degree-of-edge-symmetry calculation unit 41 and the degree of color symmetry supplied from the degree-of-color-symmetry calculation unit 42.

For example, the degree-of-symmetry determination unit 43 determines, as the degree of left-right symmetry, one of the degree of edge left-right symmetry supplied from the degree-of-edge-symmetry calculation unit 41 and the degree of color left-right symmetry supplied from the degree-of-color-symmetry calculation unit 42, the determined one being smaller than the other. In the same way, the degree-of-symmetry determination unit 43 determines, as the degree of up-down symmetry, one of the degree of edge up-down symmetry supplied from the degree-of-edge-symmetry calculation unit 41 and the degree of color up-down symmetry supplied from the degree-of-color-symmetry calculation unit 42, the determined one being smaller than the other.

In addition, the degree-of-symmetry determination unit 43 may also determine, as the degree of left-right symmetry, one of the degree of edge left-right symmetry and the degree of color left-right symmetry, the determined one being greater than the other, and determine, as the degree of up-down symmetry, one of the degree of edge up-down symmetry and the degree of color up-down symmetry, the determined one being greater than the other.

The degree-of-symmetry calculation unit 31 supplies, as the degree of symmetry, the degree of left-right symmetry and the degree of up-down symmetry, determined in this way, to the composition classification unit 33, and the processing returns to Step S11 in FIG. 9.

After Step S11, in Step S12, the parting line detection unit 32 executes parting line detection processing, and detects a parting line from a variation in the distribution of pixel information in the input image.

[Parting Line Detection Processing Performed in Parting Line Detection Unit]

Figure 20:
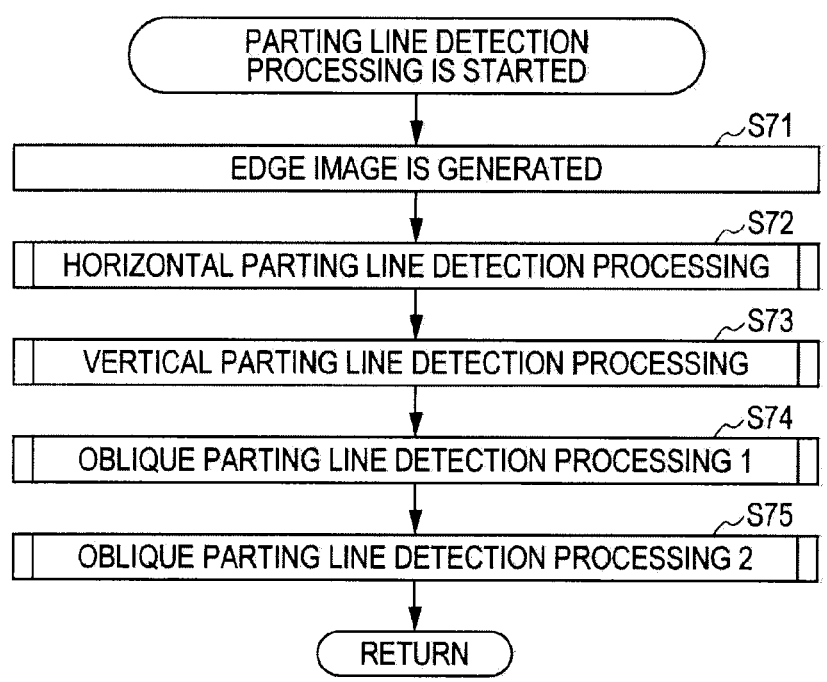
FIG. 20 is a flowchart explaining parting line detection processing.

Here, the parting line detection processing performed in Step S12 in the flowchart in FIG. 9 will be described with reference to a flowchart in FIG. 20.

In Step S71, in the same way as the processing performed in Step S41 in the flowchart in FIG. 12, the edge image generation unit 71 in the parting line detection unit 32 acquires a luminance image from the input image, and generates an edge image that includes an edge value (edge information) obtained by applying an edge extraction filter such as the Sobel filter, the Gabor filter, or the like to the luminance image.

In addition, the edge image generation unit 71 may acquire color channel images such as R, G, B and the like, compare edge values, obtained by individually applying the edge extraction filter to the color channel images, with one another between channels with respect to each pixel, and generate an edge image including individual maximum values.

Furthermore, the edge image generation unit 71 may also perform the region partitioning of a color, which utilizes a mean shift algorithm (Mean Shift method) or the like, on the input image, and generate an edge image by assigning an edge value to a pixel on the boundary line of a partitioned region. For example, in this case, an edge value "1" is assigned to a pixel on the boundary line of a region, and an edge value "0" is assigned to a pixel in a region other than the boundary line.

Figure 21:
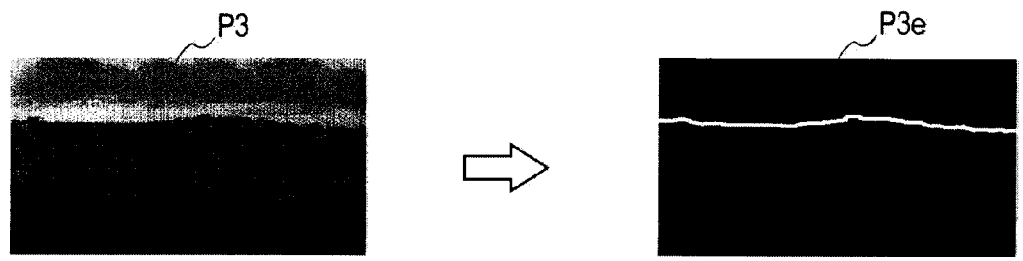
FIG. 21 is a diagram explaining an input image and an edge image.

For example, when, as illustrated in FIG. 21, a scenery image including the horizon is input as an input image P3, the edge image generation unit 71 generates an edge image P3e that indicates the profile shape of the scene. The edge image P3e generated in this way is supplied to the horizontal parting line detection unit 72 to the oblique parting line detection unit 75.

In Step S72, the horizontal parting line detection unit 72 executes horizontal parting line detection processing, and detects a horizontal parting line partitioning the input image in the horizontal direction (namely, into up and down), on the basis of the edge image supplied from the edge image generation unit 71.

[Horizontal Parting Line Detection Processing Performed in Horizontal Parting Line Detection Unit]

Figure 22:
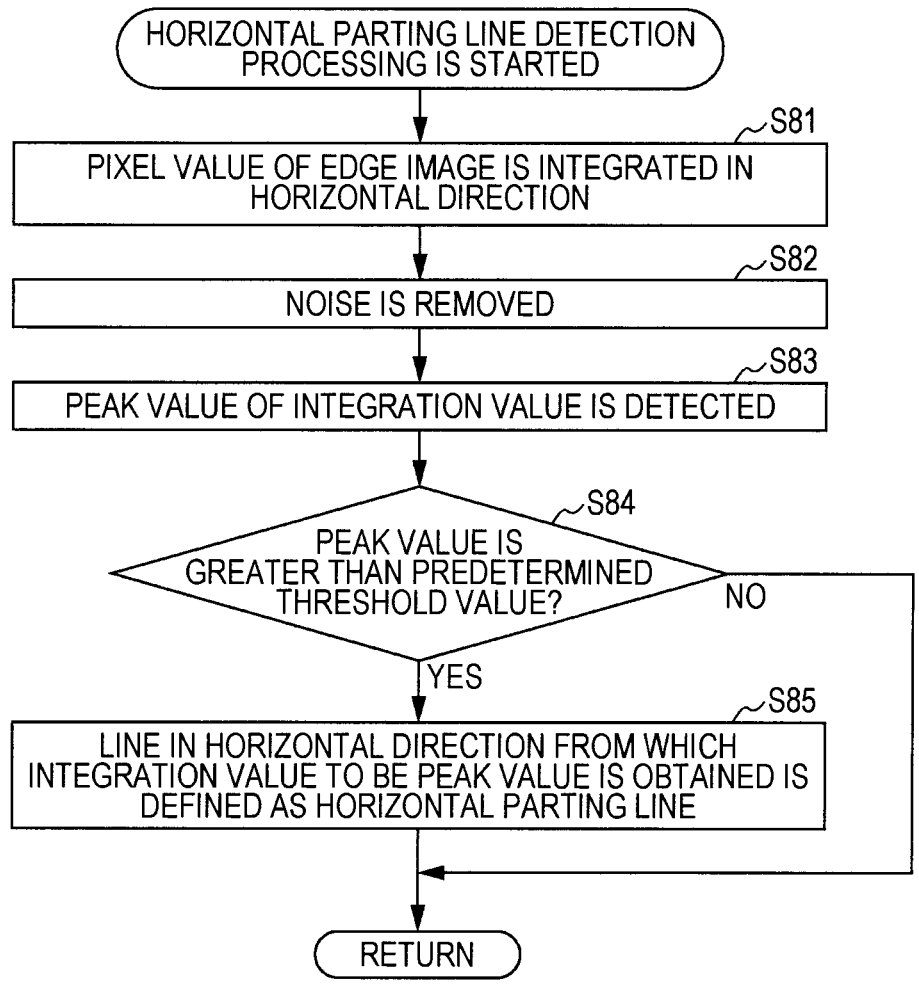
FIG. 22 is a flowchart explaining horizontal parting line detection processing.

Here, the horizontal parting line detection processing performed in Step S72 in the flowchart in FIG. 20 will be described with reference to a flowchart in FIG. 22.

In Step S81, the horizontal direction integration unit 111 in the horizontal parting line detection unit 72 integrates the edge information with respect to each of lines in the horizontal direction in the edge image supplied from the edge image generation unit 71, and supplies the integration result thereof to the LPF 112.

In addition, when integrating the edge information, the horizontal direction integration unit 111 may integrate the edge information after weighting the edge information of each pixel with such a weighting coefficient was indicated in the above-mentioned Expression (3). Accordingly, an integration value decreases with an increase in the distance of the integration value from the center of the edge image.

Figure 23:
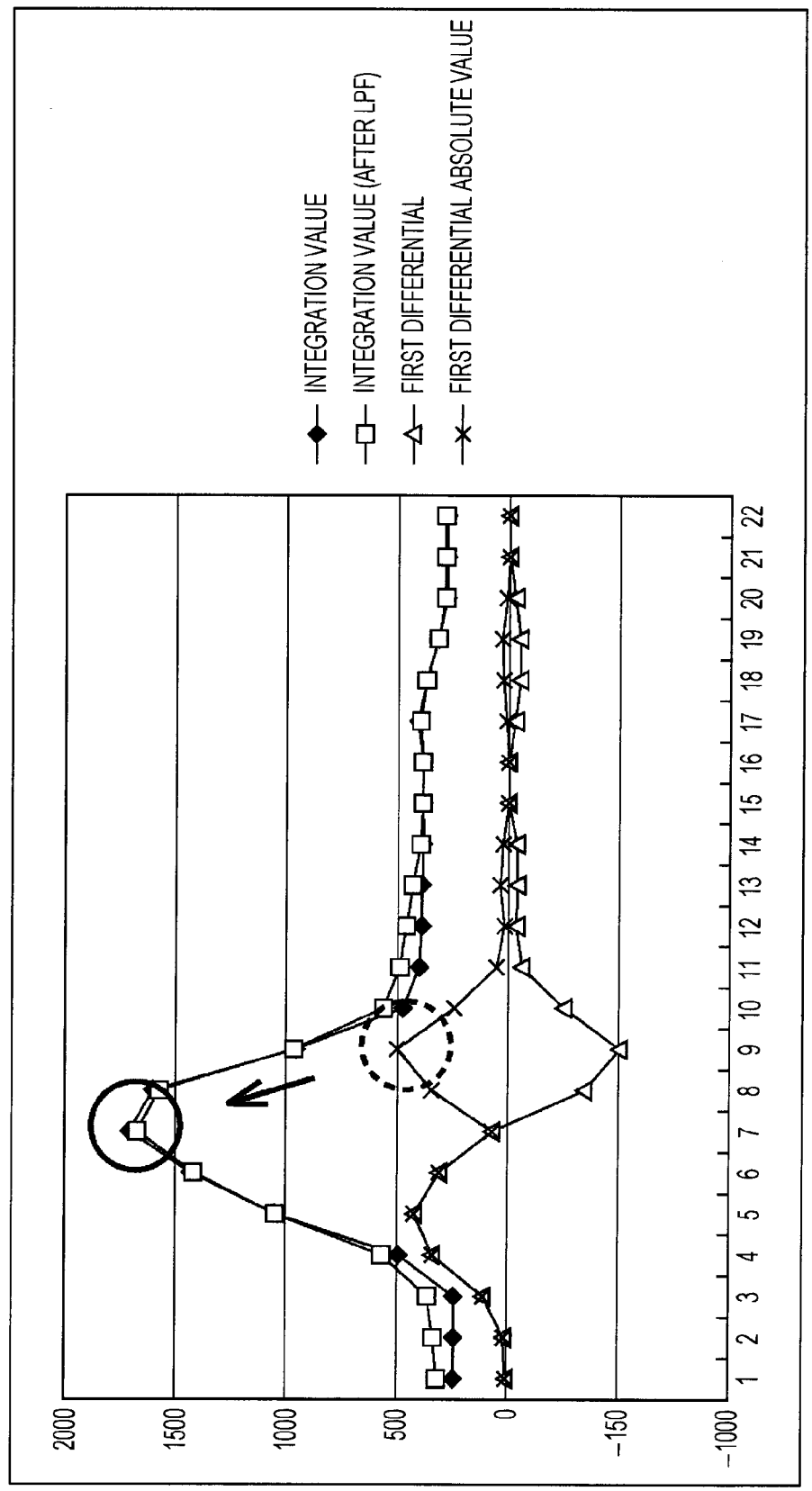
FIG. 23 is a diagram explaining an integration value in a horizontal direction of edge information.

The integration result obtained here is the integration value of the edge information in the horizontal direction, with respect to a pixel position in the vertical direction in the edge image (input image), and the integration result is plotted by a black diamond shape in a graph illustrated in FIG. 23.

FIG. 23 illustrates examples of the integration value in the horizontal direction of the edge information, calculated by the horizontal parting line detection processing, and a value obtained by performing an operation described later on the integration value.

In the graph in FIG. 23, a horizontal axis indicates the pixel position in the vertical direction of the edge image (input image).

In addition, in Step S82, by performing filtering processing on the integration value of the edge information, supplied from the horizontal direction integration unit 111, the LPF 112 removes noise, and supplies the integration value to the peak value detection unit 113. In FIG. 23, the integration result from which noise is removed is plotted by a white square.

In Step S83, the peak value detection unit 113 detects the peak value of the integration value from the integration result from which noise is removed by the LPF 112.

Specifically, the peak value detection unit 113 calculates a first differential value (plotted by a white triangle in FIG. 23) of the integration value from which noise is removed, and furthermore, calculates a first differential absolute value (plotted by a cross mark in FIG. 23) that is the absolute value of the first differential value. The peak value detection unit 113 defines, as the peak value of an integration value, an integration value (a point surrounded by a solid line circle in FIG. 23) corresponding to a first differential absolute value (a point surrounded by a dashed line circle in FIG. 23) where the first differential value thereof has a negative value and the first differential absolute value has a local maximum value. Accordingly, in the integration value, a steeply varying peak value is detected.

The peak value detection unit 113 supplies to the threshold value processing unit 114 the detected peak value and the pixel position (pixel position 7 in the example of FIG. 23) in the vertical direction of the line in the horizontal direction from which the integration value to be the peak value is obtained.

In Step S84, the threshold value processing unit 114 compares the peak value from the peak value detection unit 113 with a predetermined threshold value, and determines whether or not the peak value is greater than the predetermined threshold value.

In Step S84, when it is determined that the peak value is greater than the predetermined threshold value, the processing proceeds to Step S85, and the threshold value processing unit 114 defines, as a horizontal parting line, the line in the horizontal direction (line at the pixel position 7 in the vertical direction) from which the integration value to be the peak value is obtained. In addition, the threshold value processing unit 114 outputs, as horizontal parting line information, the pixel position in the vertical direction of the line in the edge image, and the horizontal parting line detection processing is finished. After that, the processing returns to Step S72 in FIG. 20.

Figure 24:
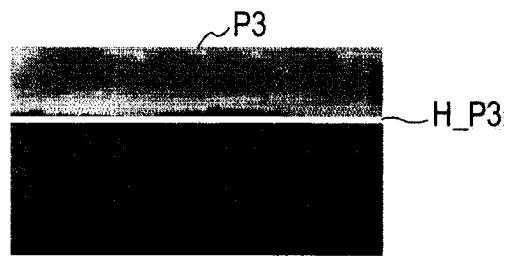
FIG. 24 is a diagram explaining an example of a detection result of a horizontal parting line.

In this way, when such an input image P3 as illustrated in FIG. 21 is input, the line in the horizontal direction in the horizon portion in the input image P3 is detected as the horizontal parting line as illustrated in FIG. 24.

On the other hand, when, in Step S84, it is determined that the peak value is not greater than the predetermined threshold value, the processing in Step S85 is skipped. In this case, the horizontal parting line is not detected, and the horizontal parting line detection processing is finished. After that, the processing returns to Step S72 in FIG. 20.

After Step S72, in Step S73, the vertical parting line detection unit 73 executes vertical parting line detection processing, and detects a vertical parting line partitioning the input image in the vertical direction (namely, into right and left), on the basis of the edge image supplied from the edge image generation unit 71.

[Vertical Parting Line Detection Processing Performed in Vertical Parting Line Detection Unit]

Figure 25:
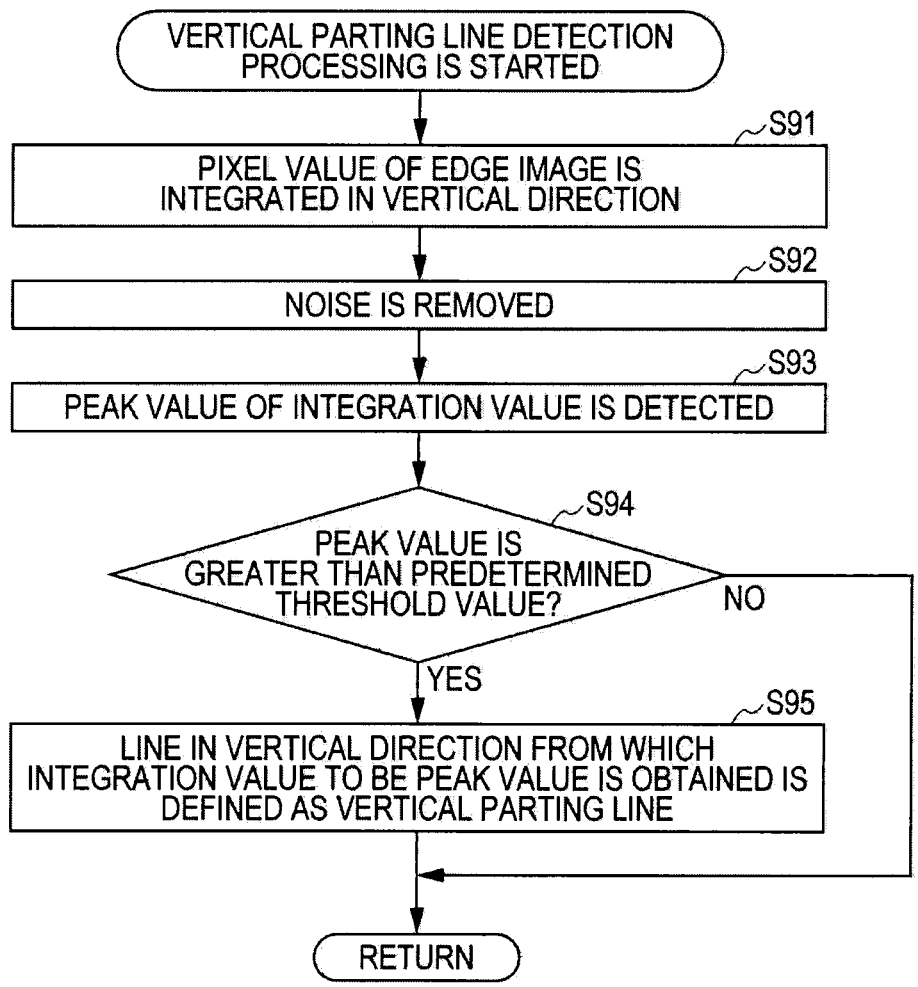
FIG. 25 is a flowchart explaining vertical parting line detection processing.

Here, the vertical parting line detection processing performed in Step S73 in the flowchart in FIG. 20 will be described with reference to a flowchart in FIG. 25.

In Step S91, the vertical direction integration unit 121 in the vertical parting line detection unit 73 integrates the edge information with respect to each of lines in the vertical direction in the edge image supplied from the edge image generation unit 71, and supplies the integration result thereof to the LPF 122.

In addition, when integrating the edge information, the vertical direction integration unit 121 may integrate the edge information after weighting the edge information with such a weighting coefficient was indicated in the above-mentioned Expression (3). Accordingly, an integration value decreases with an increase in the distance of the integration value from the center of the edge image.

Figure 26:
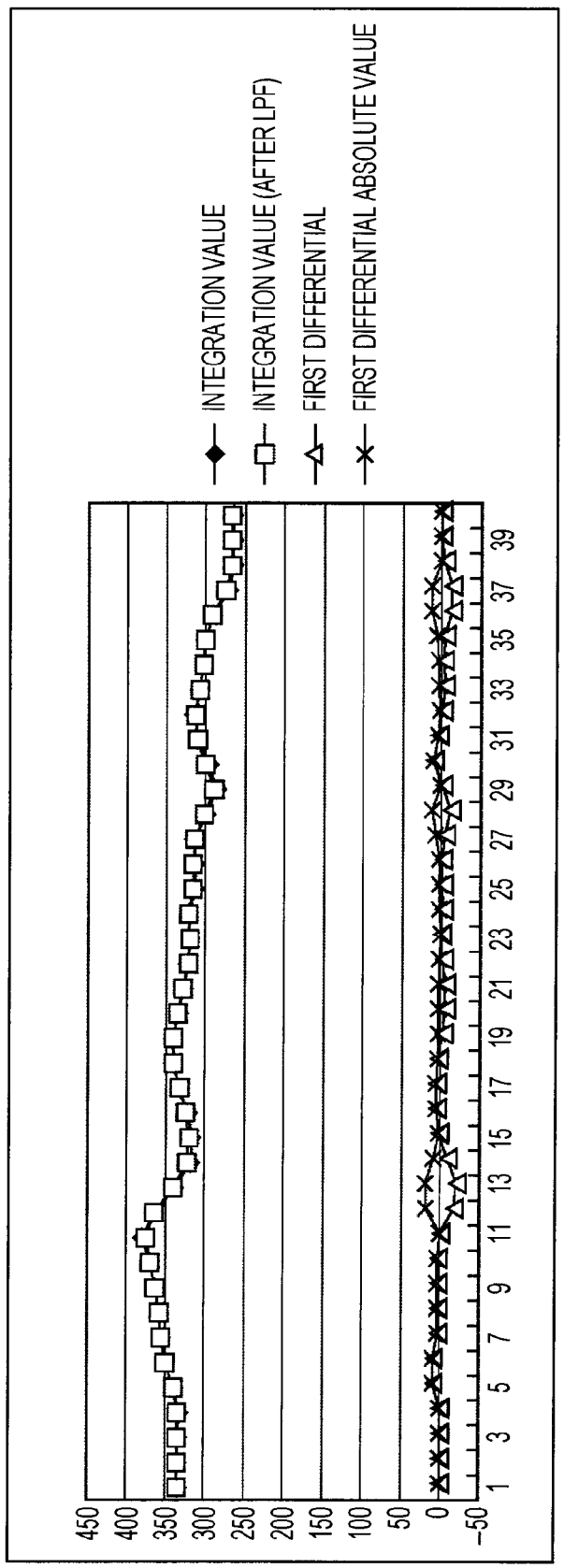
FIG. 26 is a diagram explaining an integration value in a vertical direction of edge information.

The integration result obtained here is the integration value of the edge information in the vertical direction, with respect to a pixel position in the horizontal direction in the edge image (input image), and the integration result is plotted by a black diamond shape in a graph illustrated in FIG. 26.

FIG. 26 illustrates examples of the integration value in the vertical direction of the edge information, calculated by the vertical parting line detection processing, and a value obtained by performing an operation described later on the integration value.

In the graph in FIG. 26, a horizontal axis indicates the pixel position in the horizontal direction of the edge image (input image).

In addition, in Step S92, by performing filtering processing on the integration value of the edge information, supplied from the vertical direction integration unit 121, the LPF 122 removes noise, and supplies the integration value to the peak value detection unit 123. In FIG. 26, the integration result from which noise is removed is plotted by a white square.

In Step S93, the peak value detection unit 123 detects the peak value of the integration value from the integration result from which noise is removed by the LPF 122.

Specifically, the peak value detection unit 123 calculates a first differential value (plotted by a white triangle in FIG. 26) of the integration value from which noise is removed, and furthermore, calculates a first differential absolute value (plotted by a cross mark in FIG. 26) that is the absolute value of the first differential value. The peak value detection unit 123 defines, as the peak value of an integration value, an integration value corresponding to a first differential absolute value where the first differential value thereof has a negative value and the first differential absolute value has a local maximum value. In FIG. 26, while there is no peak value steeply varying in such a way as in the example in FIG. 23, an integration value to be a peak value is obtained at a pixel position 11 in the horizontal direction.

The peak value detection unit 123 supplies to the threshold value processing unit 124 the detected peak value and the pixel position (pixel position 11 in FIG. 26) in the horizontal direction of the line in the vertical direction from which the integration value to be the peak value is obtained.

In Step S94, the threshold value processing unit 124 compares the peak value from the peak value detection unit 123 with a predetermined threshold value, and determines whether or not the peak value is greater than the predetermined threshold value.

In Step S94, when it is determined that the peak value is greater than the predetermined threshold value, the processing proceeds to Step S95, and the threshold value processing unit 124 defines, as a vertical parting line, the line in the vertical direction from which the integration value to be the peak value is obtained. In addition, the threshold value processing unit 124 outputs, as vertical parting line information, the pixel position in the horizontal direction of the line in the edge image, and the vertical parting line detection processing is finished. After that, the processing returns to Step S73 in FIG. 20.

On the other hand, when, in Step S94, it is determined that the peak value is not greater than the predetermined threshold value, the processing in Step S95 is skipped. For example, when the peak value in FIG. 26 is smaller than the predetermined threshold value, the vertical parting line is not detected, and the vertical parting line detection processing is finished. After that, the processing returns to Step S73 in FIG. 20.

After Step S73, in Step S74, the oblique parting line detection unit 74 executes oblique parting line detection processing 1, and detects a first vertical parting line partitioning the input image in an upper right oblique direction, on the basis of the edge image supplied from the edge image generation unit 71.

[Oblique Parting Line Detection Processing Performed in Oblique Parting Line Detection Unit]

Figure 27:
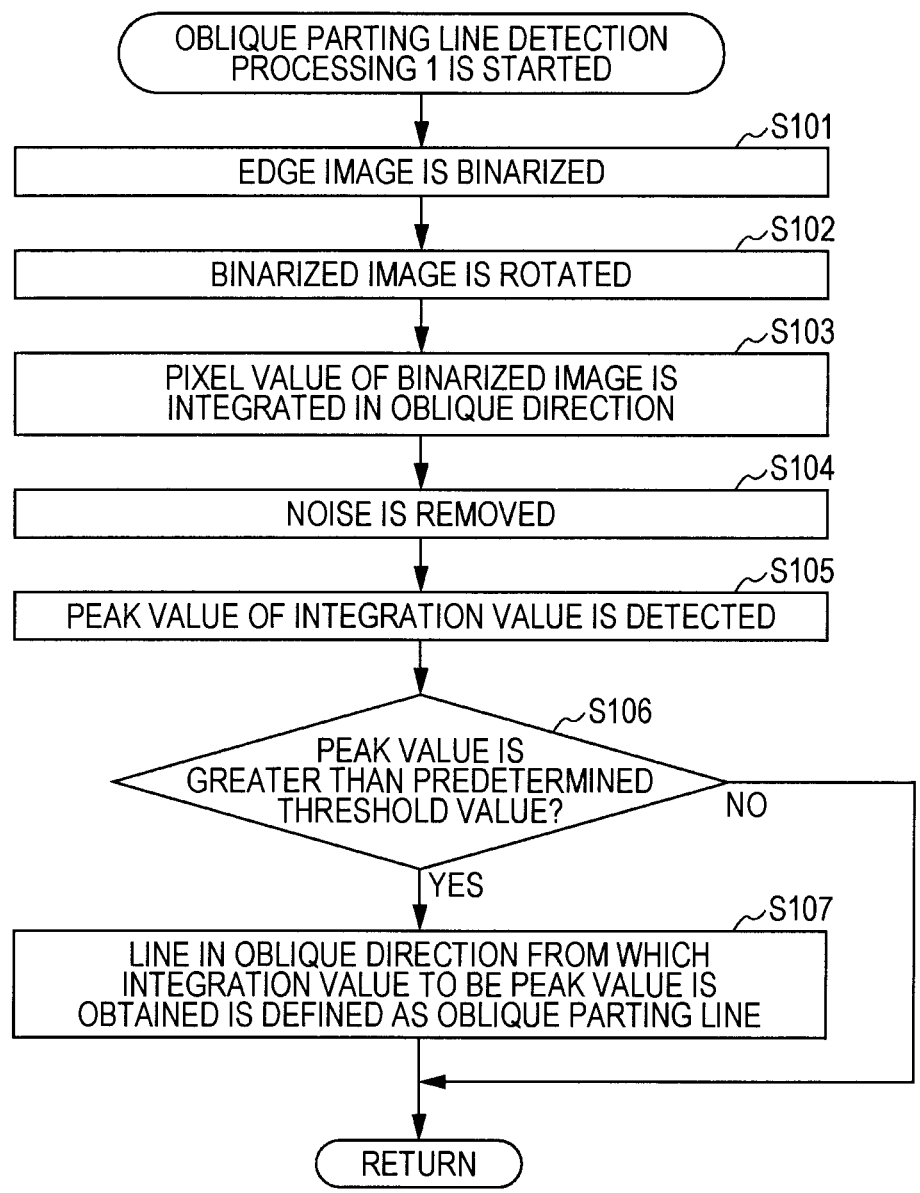
FIG. 27 is a flowchart explaining oblique parting line detection processing.

Here, the oblique parting line detection processing 1 performed in Step S74 in the flowchart in FIG. 20 will be described with reference to a flowchart in FIG. 27.

Figure 28:
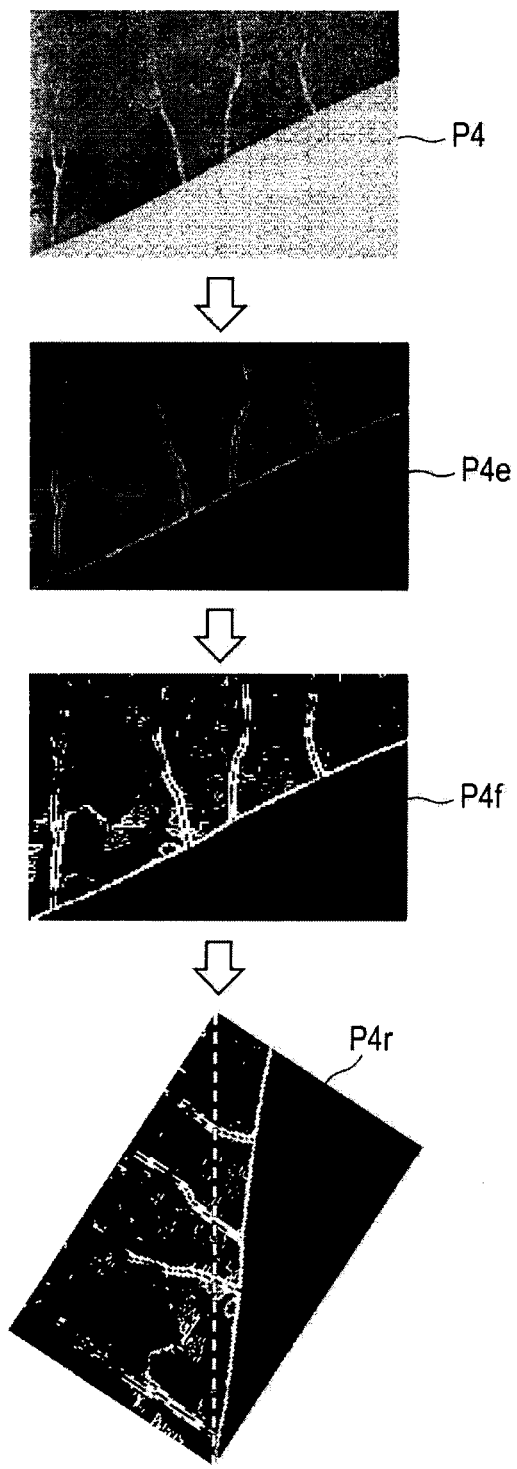
FIG. 28 is a diagram explaining an input image and an edge image, the binarization of the edge image, and the rotation of the edge image.

Here, when, as illustrated in the top portion in FIG. 28, a scenery image including a mountain the slope of which inclines from upper right to lower left is input as an input image P4, the edge image generation unit 71 generates an edge image P4e indicating the profile shape of the scene, illustrated in the second top portion in FIG. 28, and supplies the input image P4 to the horizontal parting line detection unit 72 to the oblique parting line detection unit 75.

In Step S101, the oblique direction integration unit 131 in the oblique parting line detection unit 74 binarizes, into one of "0" and "1", edge information in each of pixels in the edge image supplied from the edge image generation unit 71, on the basis of a predetermined threshold value. For example, when the edge information of the edge image has a value ranging from "0" to "255", the oblique direction integration unit 131 defines, as "0", a pixel value whose value is smaller than a threshold value "127" and defines, as "1", a pixel value whose value is greater than the threshold value "127", with respect to the edge information of the edge image which is a value between "0" and "255". Accordingly, such a binarized edge image P4*f* as illustrated in the third top portion in FIG. 28 is obtained.

In Step S102, the oblique direction integration unit 131 rotates the binarized edge image P4*f* in a counterclockwise direction so that an upper right oblique diagonal line in the binarized edge image P4*f* is perpendicular to a horizontal axis in an arbitrarily set coordinate. A rotation angle at this time is calculated on the basis of the aspect ratio of the binarized edge image P4*f* (input image P4). Accordingly, such a rotated binarized edge image P4*r* as illustrated in the fourth top portion in FIG. 28 is obtained.

Since the binarized edge image P4*f* that has been binarized is rotated in this way, the number of pixels to be rotation processing targets can be reduced compared with the rotation of the edge image P4*e* before the binarization. Therefore, an operation cost can be reduced.

In Step S103, the oblique direction integration unit 131 integrates the edge information with respect to each of lines in the vertical direction in the set coordinate, in the rotated binarized edge image P4*r*, in other words, with respect to each of lines in the oblique direction which is parallel to the upper right oblique diagonal line, in the binarized edge image P4*f* before the rotation, and supplies the integration result thereof to the LPF 132.

In addition, when the oblique direction integration unit 131 integrates the edge information in the oblique direction, the number of included pixels varies depending on a line in which the edge information is integrated. Therefore, the oblique direction integration unit 131 normalizes the integration value of the edge information of each line, using the integrated number of pixels.

Here, examples of the normalization of the integration value of the edge information with respect to each of lines in the oblique direction will be described with reference to FIGS. 29 and 30.

Figure 29:
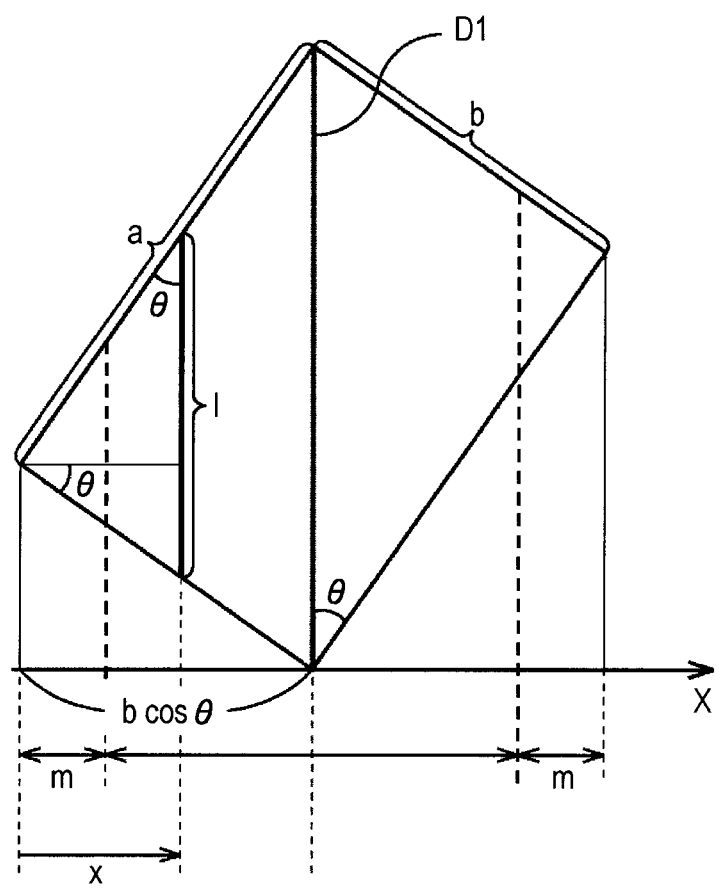
FIG. 29 is a diagram explaining an example of the normalization of an integration value of edge information of each line in an oblique direction.
Figure 30:
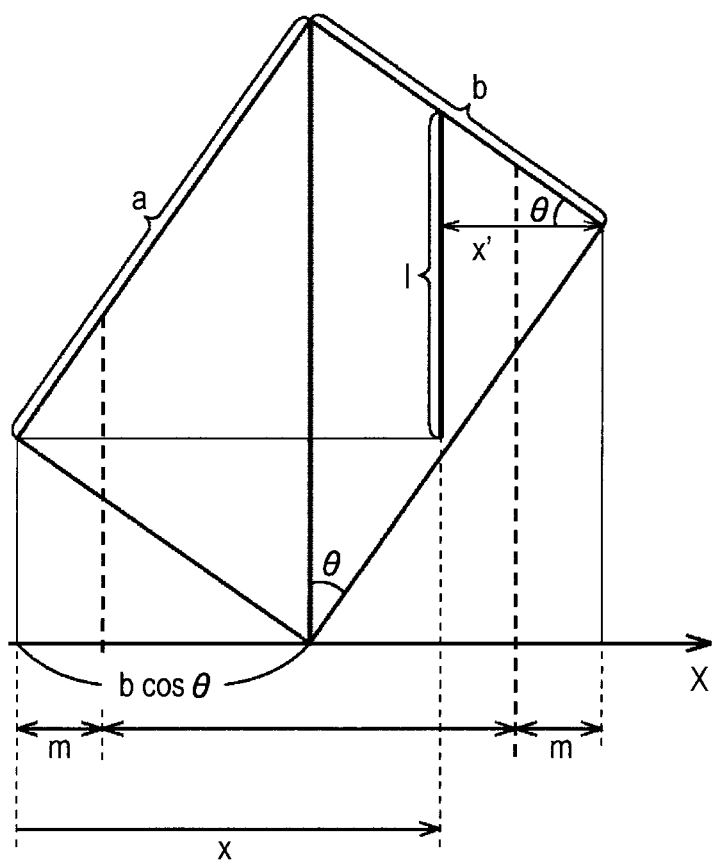
FIG. 30 is a diagram explaining an example of the normalization of an integration value of edge information of each line in an oblique direction.

Each of FIGS. 29 and 30 illustrates a rotated binarized edge image (hereinafter, also simply referred to as edge image) which is rotated so that an upper right oblique diagonal line D1 is perpendicular to an arbitrarily set coordinate (X axis). In addition, as illustrated in each of FIGS. 29 and 30, it is assumed that the length of the long side of the edge image before the rotation is "a", the length of the short side thereof is "b", and an angle between the long side and the diagonal line D1 is "θ". In addition, for example, the edge image is rotated in a counterclockwise direction by 90 degrees−θ from a state illustrated in the third top portion in FIG. 28, and hence the diagonal line D1 is perpendicular to the X axis. In addition, it is assumed that a coordinate x on the X axis indicates the virtual pixel position of a line in an oblique direction.

In addition, in each of FIGS. 29 and 30, it is assumed that portions, which are indicated by widths "m" and located at both ends of the edge image projected onto the X axis, are excluded from integration processing targets owing to the low integrated number of pixels thereof.

First, as illustrated in FIG. 29, when the line in the oblique direction in which the edge information is integrated is located on the left side of the diagonal line D1, namely, the range of the coordinate x is m≤x≤b*cos θ, the integrated number 1 of pixels is indicated by the following Expression (10).

$$I = x\left(\tan\theta + \frac{1}{\tan\theta}\right) \qquad (10)$$

In addition, as illustrated in FIG. 30, when the line in the oblique direction in which the edge information is integrated is located on the right side of the diagonal line D1, namely, the range of the coordinate x is b*cos θ<x≤a*sin θ+b*cos θ−m, the integrated number 1 of pixels is indicated by the following Expression (11).

$$\left. \begin{array}{l} I = x'\left(\tan\theta + \frac{1}{\tan\theta}\right) \\ x' = a\sin\theta + b\cos\theta - x \end{array} \right\} \qquad (11)$$

In this way, the oblique direction integration unit 131 calculates the number of pixels included in an integrated line, and normalizes the integration value of the edge information of each line, using the integrated number of pixels.

Figure 31:
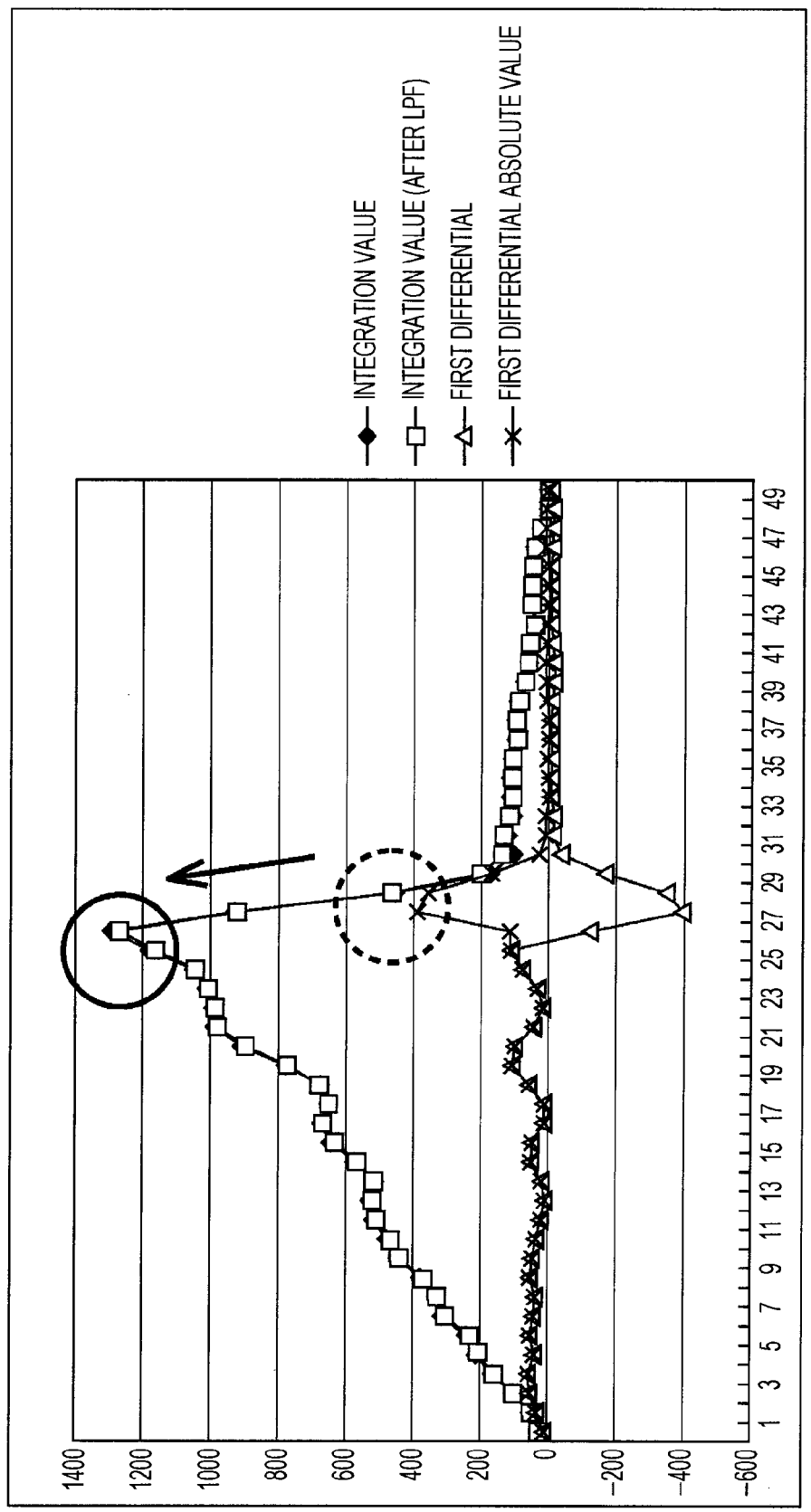
FIG. 31 is a diagram explaining an integration value in an oblique direction of edge information.

The normalized integration result obtained here is the integration value of the edge information in the vertical direction, with respect to a pixel position in the X axis direction in the edge image illustrated in each of FIGS. 29 and 30, and the integration result is plotted by a black diamond shape in a graph illustrated in FIG. 31.

FIG. 31 illustrates examples of the integration value in the upper right oblique direction of the edge information, calculated by the oblique parting line detection processing 1, and a value obtained by performing an operation described later on the integration value.

In the graph in FIG. 31, a horizontal axis indicates the pixel position in the X axis direction of the edge image (input image) illustrated in each of FIGS. 29 and 30.

In addition, in Step S104, by performing filtering processing on the integration value of the edge information, supplied from the oblique direction integration unit 131, the LPF 132 removes noise, and supplies the integration value to the peak value detection unit 133. In FIG. 31, the integration result from which noise is removed is plotted by a white square.

In Step S105, the peak value detection unit 133 detects the peak value of the integration value from the integration result from which noise is removed by the LPF 132.

Specifically, the peak value detection unit 133 calculates a first differential value (plotted by a white triangle in FIG. 31) of the integration value from which noise is removed, and furthermore, calculates a first differential absolute value (plotted by a cross mark in FIG. 31) that is the absolute value of the first differential value. The peak value detection unit 133 defines, as the peak value of an integration value, an integration value (a point surrounded by a solid line circle in FIG. 31) corresponding to a first differential absolute value (a point surrounded by a dashed line circle in FIG. 31) where the first differential value thereof has a negative value and the first differential absolute value has a local maximum value. Accordingly, in the integration value, a steeply varying peak value is detected.

The peak value detection unit 133 supplies to the threshold value processing unit 134 the detected peak value and the pixel position (pixel position 27 in the example of FIG. 31) in the X axis direction of the line in the upper right oblique direction from which the integration value to be the peak value is obtained.

In Step S106, the threshold value processing unit 134 compares the peak value from the peak value detection unit 133 with a predetermined threshold value, and determines whether or not the peak value is greater than the predetermined threshold value.

In Step S106, when it is determined that the peak value is greater than the predetermined threshold value, the processing proceeds to Step S107, and the threshold value processing unit 134 defines, as an upper right oblique parting line, the line in the upper right oblique direction (line at the pixel position 27 in the X axis direction) from which the integration value to be the peak value is obtained. In addition, the threshold value processing unit 134 outputs, as first oblique parting line information, the pixel position in the X axis direction and the angle θ of the line in the edge image, and the oblique parting line detection processing 1 is finished. After that, the processing returns to Step S74 in FIG. 20.

Figure 32:
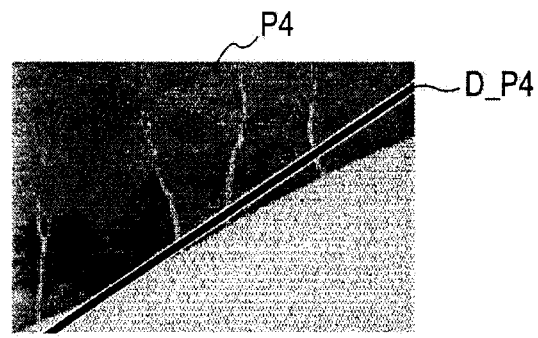
FIG. 32 is a diagram explaining an example of a detection result of an oblique parting line.

In this way, when such an input image P4 as illustrated in FIG. 28 is input, the line in the upper right oblique direction in the slope portion of the mountain in the input image P4 is detected as the upper right oblique parting line as illustrated in FIG. 32.

On the other hand, when, in Step S106, it is determined that the peak value is not greater than the predetermined threshold value, the processing in Step S107 is skipped. In this case, the upper right oblique parting line is not detected, and the oblique parting line detection processing 1 is finished. After that, the processing returns to Step S74 in FIG. 20.

After Step S74, in Step S75, the oblique parting line detection unit 75 executes oblique parting line detection processing 2, and detects a second vertical parting line partitioning the input image in the upper left oblique direction, on the basis of the edge image supplied from the edge image generation unit 71.

In addition, the oblique parting line detection processing 2 executed by the oblique parting line detection unit 75 is basically the same as that of the above-mentioned oblique parting line detection processing 1 with the exception that the edge image is rotated so that the upper left oblique diagonal line of the edge image is perpendicular to the X axis. Therefore, the description thereof will be omitted.

Incidentally, while, in the above description, the edge image is rotated so that the upper right oblique diagonal line D1 and the upper left oblique diagonal line D2 are perpendicular to the X axis, thereby detecting the upper right oblique parting line and the upper left oblique parting line, the edge image may be rotated so that a line in an arbitrary oblique direction in the edge image is perpendicular to the X axis, thereby detecting the upper right oblique parting line and the upper left oblique parting line.

In addition, even if the edge information is integrated in an arbitrary oblique direction, the number of included pixels varies depending on a line in which the edge information is integrated. Therefore, it is necessary to normalize the integration value of the edge information of each line, using the integrated number of pixels.

Here, examples of the normalization of the integration value of the edge information with respect to each of lines in the arbitrary oblique direction will be described with reference to FIGS. 33 to 35.

Figure 33:
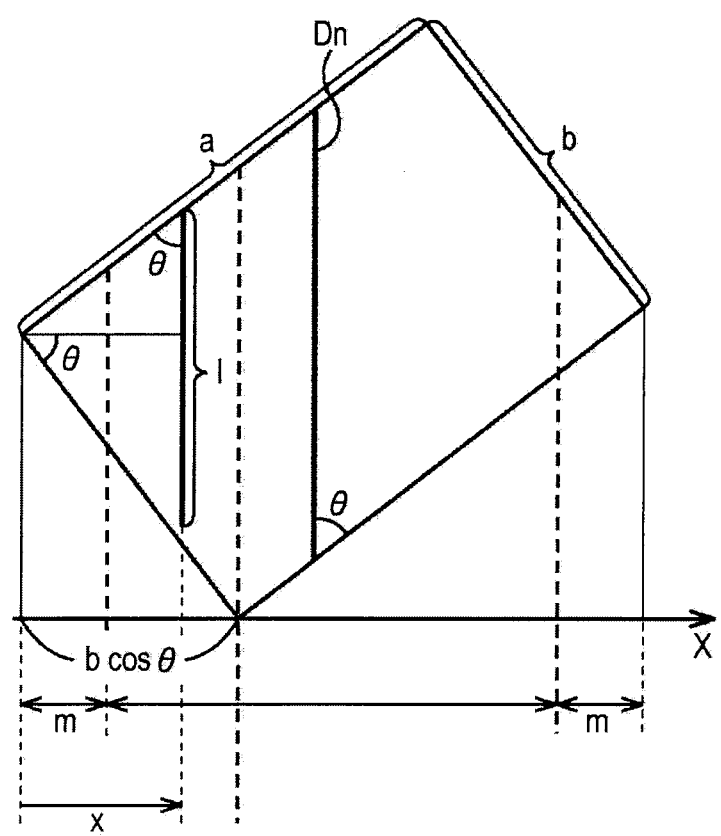
FIG. 33 is a diagram explaining another example of the normalization of an integration value of edge information of each line in an oblique direction.
Figure 34:
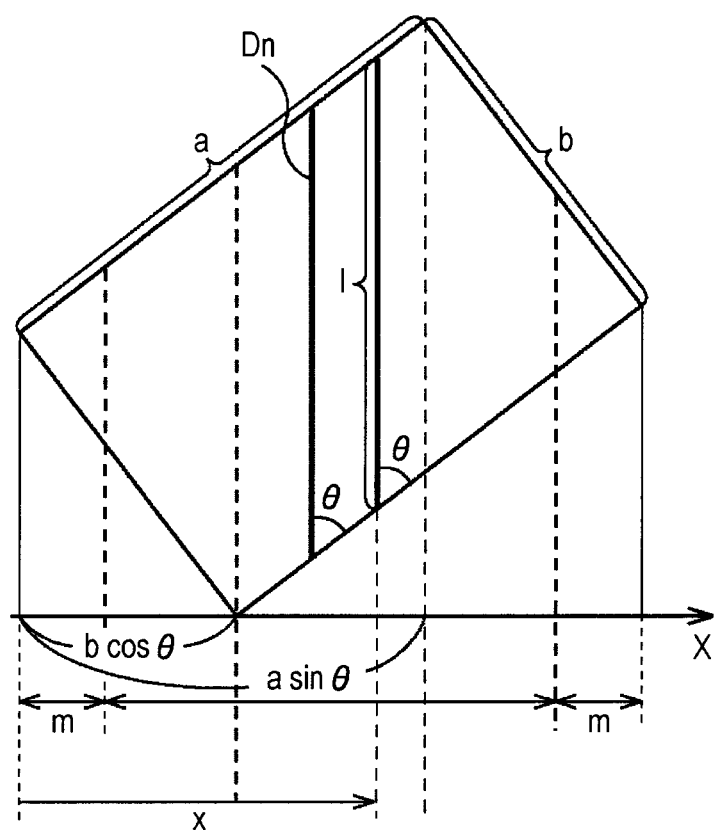
FIG. 34 is a diagram explaining another example of the normalization of an integration value of edge information of each line in an oblique direction.
Figure 35:
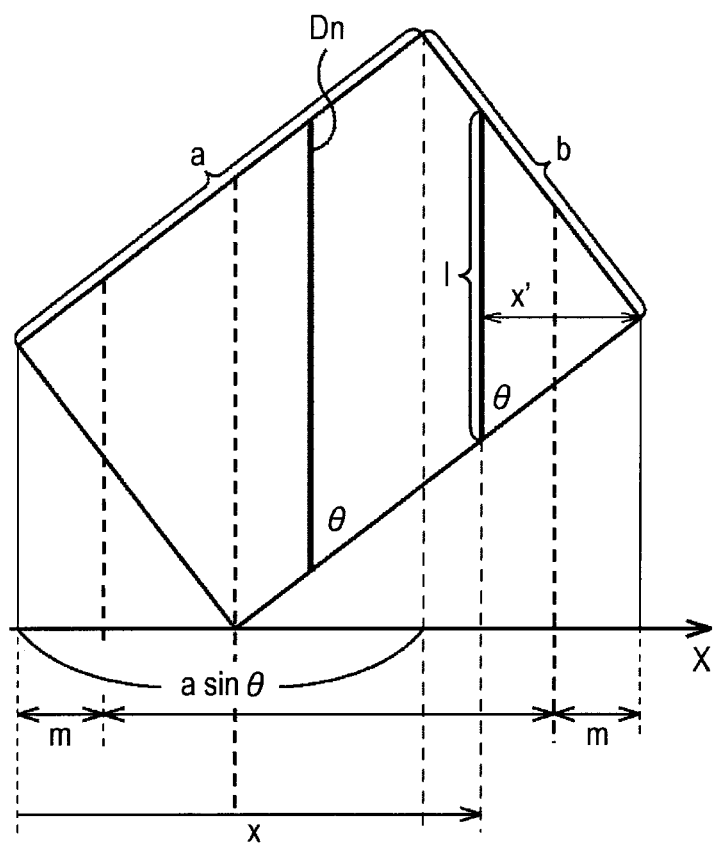
FIG. 35 is a diagram explaining another example of the normalization of an integration value of edge information of each line in an oblique direction.

Each of FIGS. 33 to 35 illustrates a rotated binarized edge image (edge image) which is rotated so that an upper right oblique line Dn, set in the edge image, is perpendicular to the X axis. In addition, as illustrated in each of FIGS. 33 to 35, it is assumed that the length of the long side of the edge image before the rotation is "a", the length of the short side thereof is "b", and an angle between the long side and the upper right oblique line Dn is "θ". In addition, for example, the edge image is rotated in a counterclockwise direction by 90 degrees−θ from a state in which the long side is parallel to the X axis, and hence the upper right oblique line Dn is perpendicular to the X axis. In addition, it is assumed that a coordinate x on the X axis indicates the virtual pixel position of a line in an oblique direction.

In addition, in each of FIGS. 33 to 35, it is assumed that portions, which are indicated by widths "m" and located at both ends of the edge image projected onto the X axis, are excluded from integration processing targets owing to the low number of pixels in which the edge information is integrated.

First, as illustrated in FIG. 33, when the range of the coordinate x is m≤x≤b*cos θ, the integrated number 1 of pixels is indicated by the following Expression (12).

$$I = x\left(\tan\theta + \frac{1}{\tan\theta}\right) \tag{12}$$

In addition, as illustrated in FIG. 34, when the range of the coordinate x is b*cos θ<x≤a*sin θ, the integrated number 1 of pixels is indicated by the following Expression (13).

$$I = \frac{b}{\sin\theta} \tag{13}$$

In addition, as illustrated in FIG. 35, when the range of the coordinate x is a*sin θ<x≤a*sin θ+b*cos θ−m, the integrated number 1 of pixels is indicated by the following Expression (14).

$$\left.\begin{array}{l}I = x'\left(\tan\theta + \dfrac{1}{\tan\theta}\right) \\ x' = a\sin\theta + b\cos\theta - x\end{array}\right\} \tag{14}$$

In this way, even if the edge information is integrated with respect to each of lines in an arbitrary oblique direction, the number of pixels including an integrated line is calculated, and the integration value of the edge information of each line is normalized using the integrated number of pixels.

As described above, the parting line detection unit 32 supplies, to the composition classification unit 33, a parting line detected by the parting line detection processing, from among the horizontal parting line information, the vertical parting line information, the first oblique parting line information, and the second oblique parting line information, and the processing returns to Step S12 in FIG. 9.

After Step S12, in Step S13, the composition classification unit 33 classifies the composition of the input image into one of preliminarily defined composition patterns, on the basis of the degree of symmetry from the degree-of-symmetry calculation unit 31 and the parting line information from the parting line detection unit 32.

Here, examples of composition patterns into which the composition of the input image is classified will be described with reference to FIG. 36.

According to the composition patterns illustrated in FIG. 36, first, the input image is classified on the basis of the degree of symmetry (the degree of left-right symmetry and the degree of up-down symmetry).

[In Case in which Degree of Left-Right Symmetry is Greater than or Equal to Threshold Value Th_LR and Degree of Up-Down Symmetry is Greater than or Equal to Threshold Value Th_TB]

In this case, the composition of the input image is classified into a composition pattern "up-down and left-right symmetry".

[In Case in which Degree of Left-Right Symmetry is Greater than or Equal to Threshold Value Th_LR and Degree of Up-Down Symmetry is Less than Threshold Value Th_TB]

In this case, the composition of the input image is further classified on the basis of horizontal parting line information. Namely, when a horizontal parting line indicated by the horizontal parting line information is located above the horizontal parting line H2 in the composition based on the Rule of Thirds described in FIG. 10, the composition of the input image is classified into a composition pattern "upper side of horizontal parting line". When the horizontal parting line indicated by the horizontal parting line information is located between the horizontal parting line H2 and the horizontal parting line H1 in the composition based on the Rule of Thirds described in FIG. 10, the composition of the input image is classified into a composition pattern "between horizontal parting lines". In addition, when the horizontal parting line indicated by the horizontal parting line information is located below the horizontal parting line H1 in the composition based on the Rule of Thirds described in FIG. 10, the composition of the input image is classified into a composition pattern "lower side of horizontal parting line".

Figure 37:
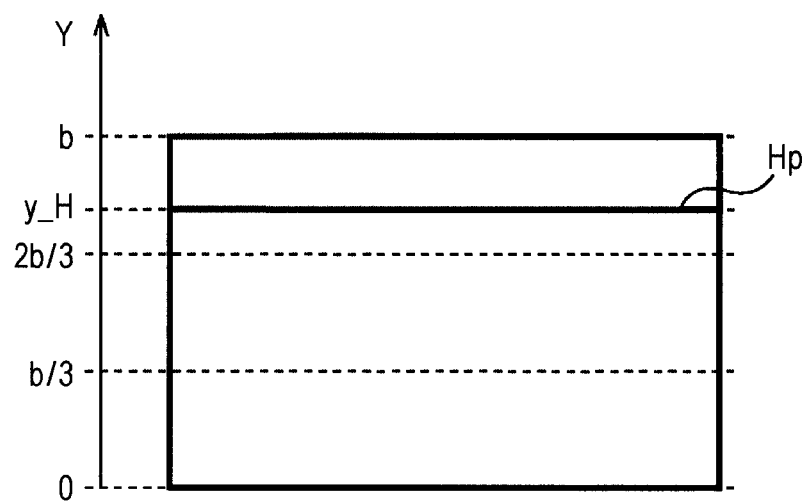
FIG. 37 is a diagram explaining an example of a composition pattern classified on the basis of a horizontal parting line.

For example, as illustrated in FIG. 37, in an input image whose height (the length of a short side) is "b", coordinate positions on a Y axis corresponding to the horizontal parting lines H1 and H2 in FIG. 10 are "b/3" and "2*b/3", respectively. At this time, when a horizontal parting line Hp is detected on the basis of the parting line detection processing, and horizontal parting line information indicating a pixel position (coordinate position) y_H is supplied from the parting line detection unit 32, the composition classification unit 33 determines that 2*b/3 y_H≤b, and classifies the composition of the input image into the composition pattern "upper side of horizontal parting line". In addition, when determining that 0≤y_H≤b/3, the composition classification unit 33 classifies the composition of the input image into the composition pattern "lower side of horizontal parting line". In addition, when determining that b/3<y_H≤2*b/3, the composition classification unit 33 classifies the composition of the input image into the composition pattern "between horizontal parting lines".

In addition, when no horizontal parting line is detected on the basis of the parting line detection processing, and no horizontal parting line information is supplied from the parting line detection unit 32, the composition classification unit 33 classifies the composition of the input image into a composition pattern "other".

[In Case in which Degree of Left-Right Symmetry is Less than Threshold Value Th_LR and Degree of Up-Down Symmetry is Greater than or Equal to Threshold Value Th_TB]

In this case, the composition of the input image is further classified on the basis of vertical parting line information. Namely, when a vertical parting line indicated by the vertical parting line information is located on the left side of the vertical parting line V1 in the composition based on the Rule of Thirds described in FIG. 10, the composition of the input image is classified into a composition pattern "left side of vertical parting line". When the vertical parting line indicated by the vertical parting line information is located between the vertical parting line V1 and the vertical parting line V2 in the composition based on the Rule of Thirds described in FIG. 10, the composition of the input image is classified into a composition pattern "between vertical parting lines". In addition, when the vertical parting line indicated by the vertical parting line information is located on the right side of the vertical parting line V2 in the composition based on the Rule of Thirds described in FIG. 10, the composition of the input image is classified into a composition pattern "right side of vertical parting line".

Figure 38:
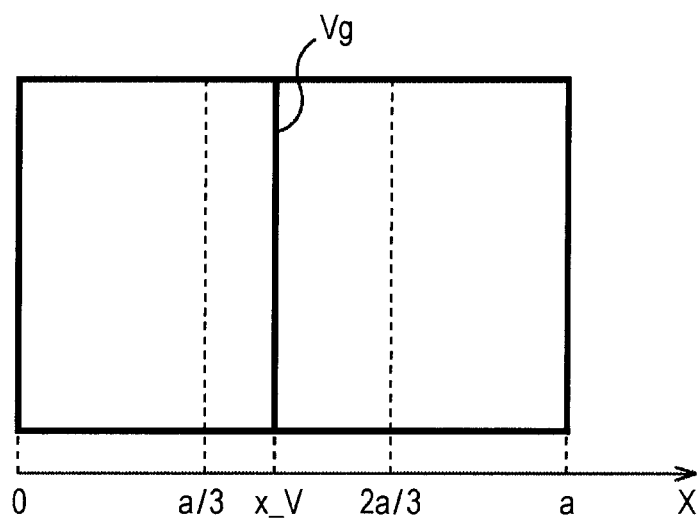
FIG. 38 is a diagram explaining an example of a composition pattern classified on the basis of a vertical parting line.

For example, as illustrated in FIG. 38, in an input image whose width (the length of a long side) is "a", coordinate positions on an X axis corresponding to the vertical parting lines V1 and V2 in FIG. 10 are "a/3" and "2*a/3", respectively. At this time, when a vertical parting line Vg is detected on the basis of the parting line detection processing, and vertical parting line information indicating a pixel position (coordinate position) x_V is supplied from the parting line detection unit 32, the composition classification unit 33 determines that a/3<x_V≤2*a/3, and classifies the composition of the input image into the composition pattern "between vertical parting lines". In addition, when determining that 0≤x_V≤a/3, the composition classification unit 33 classifies the composition of the input image into the composition pattern "left side of vertical parting line". In addition, when determining that 2*a/3<x_V≤a, the composition classification unit 33 classifies the composition of the input image into the composition pattern "between vertical parting lines".

In addition, when no vertical parting line is detected on the basis of the parting line detection processing, and no vertical parting line information is supplied from the parting line detection unit 32, the composition classification unit 33 classifies the composition of the input image as a composition pattern "other".

[In Case in which Degree of Left-Right Symmetry is Less than Threshold Value Th_LR and Degree of Up-Down Symmetry is Less than Threshold Value Th_TB]

Figure 39A:
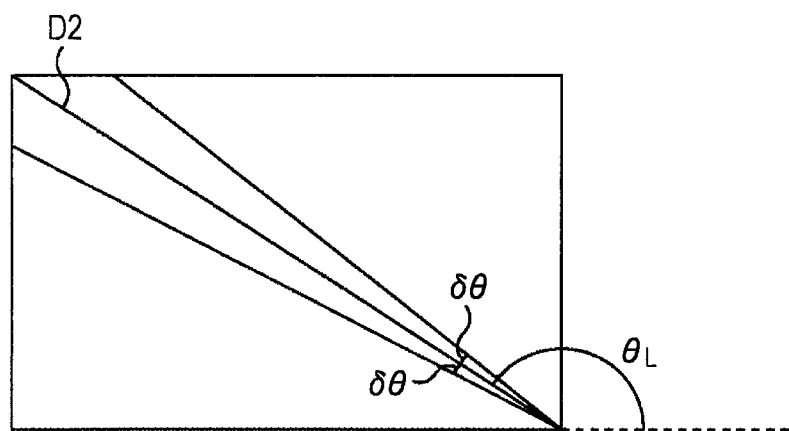
FIGS. 39A and 39B are diagrams explaining examples of a composition pattern classified on the basis of an oblique parting line.
Figure 39B:
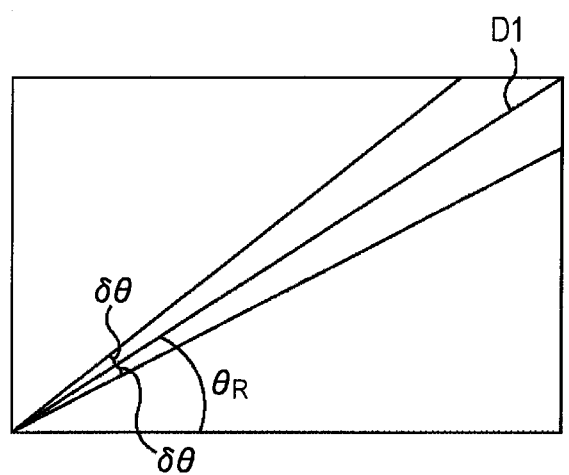

In this case, the composition of the input image is further classified on the basis of first or second oblique parting line information. Namely, when the angle of an oblique parting line with respect to a horizontal direction, indicated by the first oblique parting line information, is included within a predetermined angular range from the angle of the diagonal line D1 with respect to the horizontal direction in the diagonal composition described in FIG. 10, the composition of the input image is classified into a composition pattern "upper right oblique parting line". Specifically, as illustrated in FIG. 39B, when the angle of the diagonal line D1 with respect to the horizontal direction is $\theta_R$, and the angle $\theta$ of an oblique parting line with respect to the horizontal direction, indicated by the first oblique parting line information, is included within a range $\theta_R - \delta\theta \leq \theta \leq \theta_R + \delta\theta$, the composition of the input image is classified into the composition pattern "upper right oblique parting line". In addition, when the angle of an oblique parting line with respect to a horizontal direction, indicated by the second oblique parting line information, is included within a predetermined angular range from the angle of the diagonal line D2 with respect to the horizontal direction in the diagonal composition described in FIG. 10, the composition of the input image is classified into a composition pattern "upper left oblique parting line". Specifically, as illustrated in FIG. 39A, when the angle of the diagonal line D2 with respect to the horizontal direction is $\theta_L$, and the angle $\theta$ of an oblique parting line with respect to the horizontal direction, indicated by the oblique parting line information is included within a range $\theta_L - \delta\theta \leq \theta \leq \theta_L + \delta\theta$, the composition of the input image is classified into the composition pattern "upper left oblique parting line".

Figure 40:
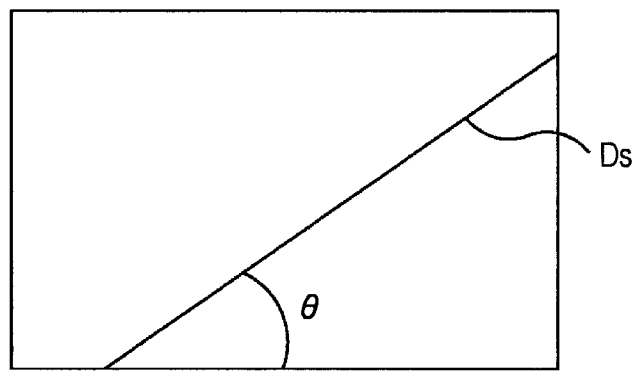
FIG. 40 is a diagram explaining an example of a composition pattern classified on the basis of an oblique parting line.

For example, when an oblique parting line Ds is detected on the basis of the parting line detection processing, in an input image illustrated in FIG. 40, and the first oblique parting line information indicating an angle θ is supplied from the parting line detection unit 32, the composition classification unit 33 determines that $\theta_R-\delta\theta \leq \theta \leq \theta_R+\delta\theta$, and classifies the composition of the input image into the composition pattern "upper right oblique parting line". In addition, when determining that $\theta_L-\delta\theta \leq \theta \leq \theta_L+\delta\theta$, the composition classification unit 33 classifies the composition of the input image into the composition pattern "upper left oblique parting line".

In addition, when none of the upper right oblique parting line and the upper left oblique parting line is detected on the basis of the parting line detection processing, and none of the first oblique parting line information and second oblique parting line information is supplied from the parting line detection unit 32, the composition classification unit 33 classifies the composition of the input image into a composition pattern "other".

The composition patterns classified in this way are output, along with the degree of symmetry and the parting line information, to an information processing device, a storage device, or the like, not illustrated.

According to the above-mentioned processing, since the composition of the input image is classified on the basis of the degree of symmetry indicating the line symmetry of the edge information and the color information in the input image and the parting line indicating a variation in the distribution of pixel information (edge information) in the input image, the composition of the input image can be classified while it is not necessary to recognize a subject or the state of the subject or calculate an evaluation value between the input image and a preliminarily prepared composition with respect to each of pixels. In addition, the composition is not classified using only the line symmetry of the edge information but the composition of the input image can be classified further using the line symmetry of the color information or the position of a parting line. Accordingly, the composition of the input image can be classified into detailed composition patterns with a lower-cost operation.

In addition, the degree of symmetry and the parting line information, output along with the composition patterns to the information processing device, the storage device, or the like, not illustrated, may be assigned as the metadata of the input image.

Accordingly, recorded images can be searched or classified on the basis of the degree of symmetry or the parting line information (the position of a parting line).

Furthermore, the degree of symmetry or the parting line information is used as the characteristic amount of the input image, along with a frequency distribution or a color distribution, and hence recognition accuracy in image recognition can be improved.

Incidentally, in the above description, as described with reference to FIG. 36, when the composition of the input image is classified, the composition is roughly classified on the basis of the degree of symmetry first, and, furthermore, is finely classified on the basis of the position of the parting line. Here, a relationship between the degree of symmetry and the parting line, described with reference to FIG. 36, is illustrated in FIG. 41.

Figure 41:
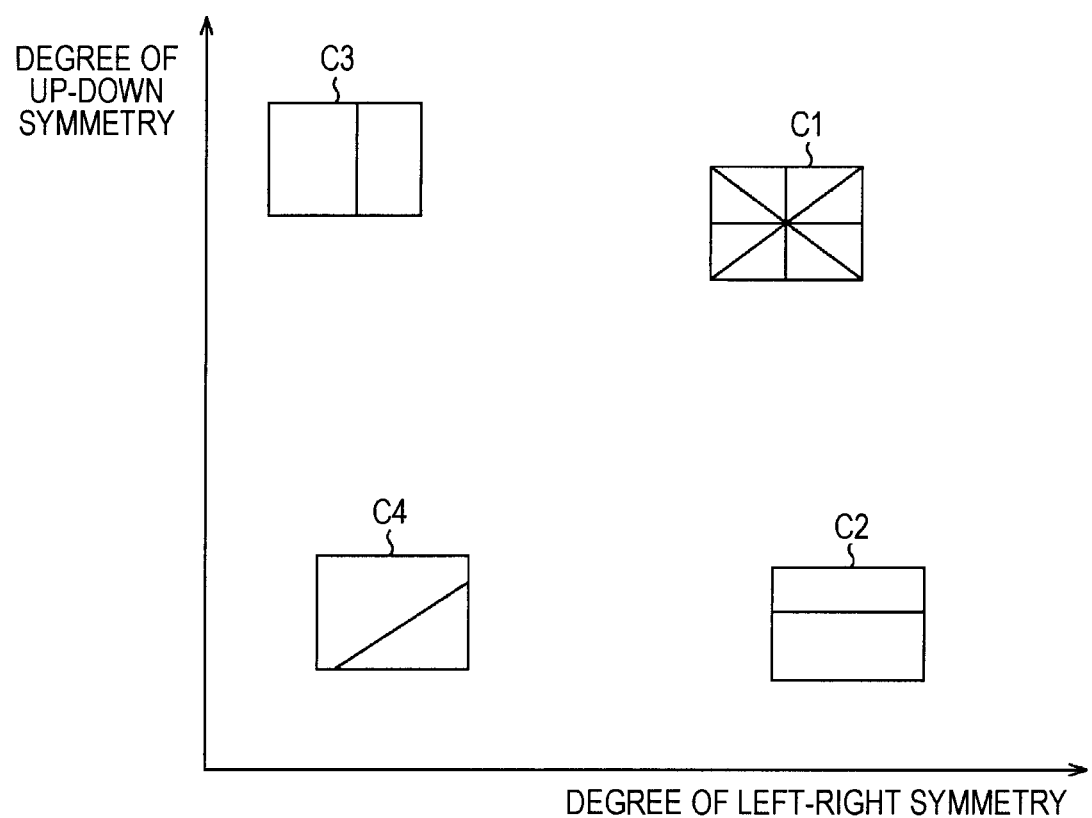
FIG. 41 is a diagram illustrating a relationship between a degree of symmetry and a parting line.

In FIG. 41, a horizontal axis and a vertical axis indicate the degree of left-right symmetry and the degree of up-down symmetry, respectively, and composition patterns C1 to C4 are distributed on a two-dimensional space provided by the individual axes.

In the two-dimensional space illustrated in FIG. 41, the composition pattern C1 indicating the composition pattern "up-down and left-right symmetry" is located in a region in which both the degree of left-right symmetry and the degree of up-down symmetry are large. In addition, the composition pattern C2 indicating the composition pattern "between horizontal parting lines" is located in a region in which the degree of left-right symmetry is large and the degree of up-down symmetry is small, and the composition pattern C3 indicating the composition pattern "between vertical parting lines" is located in a region in which the degree of left-right symmetry is small and the degree of up-down symmetry is large. In addition, the composition pattern C4 indicating the composition pattern "upper right oblique parting line" is located in a region in which both the degree of left-right symmetry and the degree of up-down symmetry are small.

In addition, for example, a composition pattern "upper side of vertical parting line" is not located in a region in which the degree of left-right symmetry is large and the degree of up-down symmetry is small, and for example, the composition pattern "lower side of horizontal parting line" is not located in a region in which the degree of left-right symmetry is small and the degree of up-down symmetry is large.

In this way, since parting lines able to be detected and composition pattern able to be classified are limited depending on the calculation results of the degree of left-right symmetry and the degree of up-down symmetry, a part or the whole of the parting line detection processing may be omitted.

Namely, when both the degree of left-right symmetry and the degree of up-down symmetry are large, the composition of the input image is classified into the composition pattern "up-down and left-right symmetry" regardless of the detection result of a parting line. Therefore, the whole parting line detection processing may be omitted.

In addition, when the degree of left-right symmetry is large and the degree of up-down symmetry is small, the composition of the input image is classified into one of the composition patterns "upper side of horizontal parting line", "between horizontal parting lines", "lower side of horizontal parting line", and "other". Therefore, it is only necessary to execute the horizontal parting line detection processing, and the vertical parting line detection processing, the oblique parting line detection processing 1, and the oblique parting line detection processing 2 may be omitted.

In the same way, when the degree of left-right symmetry is small and the degree of up-down symmetry is large, the composition of the input image is classified into one of the composition patterns "left side of vertical parting line", "between vertical parting lines", "right side of vertical parting line", and "other". Therefore, it is only necessary to execute the vertical parting line detection processing, and the horizontal parting line detection processing, the oblique parting line detection processing 1, and the oblique parting line detection processing 2 may be omitted.

Furthermore, when both the degree of left-right symmetry and the degree of up-down symmetry are small, the composition of the input image is classified into one of the composition patterns "upper right oblique parting line", "upper left oblique parting line", and "other". Therefore, it is only necessary to execute the oblique parting line detection processing 1 and the oblique parting line detection processing 2, and the horizontal parting line detection processing and the vertical parting line detection processing may be omitted.

In this way, the parting line detection processing is executed after the degree-of-symmetry calculation processing, and hence a part or the whole of the parting line detection processing may be omitted depending on the calculation result of the degree-of-symmetry calculation processing. Therefore, the composition of the input image can be classified with a lower-cost operation.

Figure 42:
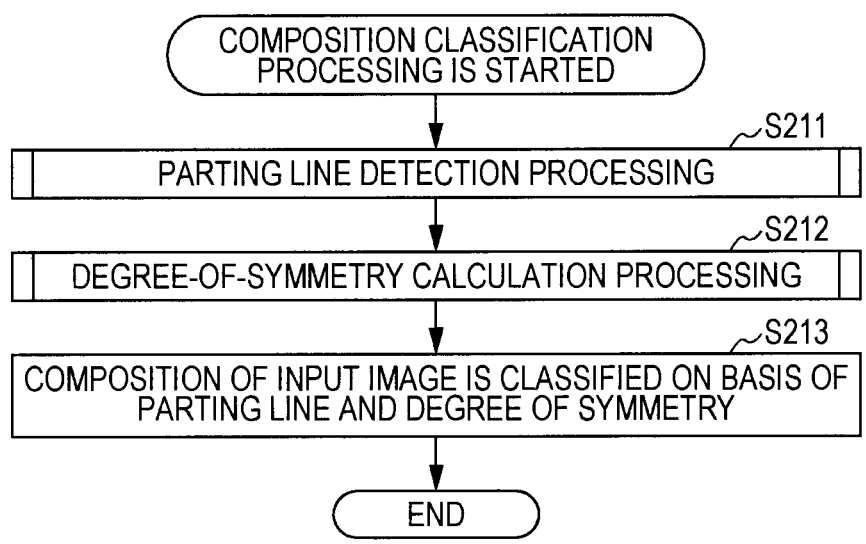
FIG. 42 is a flowchart explaining another operation of composition classification processing.

In addition, while, in the above description, as the flowchart in FIG. 9, the parting line detection processing is executed after the degree-of-symmetry calculation processing, the degree-of-symmetry calculation processing may be executed after the parting line detection processing, in reverse, as a flowchart in FIG. 42.

FIG. 42 is a flowchart explaining composition classification processing in which the degree-of-symmetry calculation processing is to be executed after the parting line detection processing.

In addition, since, in processing performed in Step S211 to S213 in the flowchart in FIG. 42, processing performed in Step S12 and processing performed in Step S11 in the flowchart in FIG. 9 are just replaced with each other, the detailed description thereof will be omitted.

In this regard, however, since, owing to the relationship between the degree of symmetry and the parting line, described in FIG. 41, parting lines able to be detected and composition patterns able to be classified are limited also depending on the calculation result of the parting line, a part of the degree-of-symmetry calculation processing may be omitted.

Namely, when only the horizontal parting line is detected as a parting line, the degree of left-right symmetry tends to be large and the degree of up-down symmetry tends to be small. Therefore, the calculation processing of the degree of up-down symmetry in the degree-of-edge-symmetry calculation processing or the degree-of-color-symmetry calculation processing may be omitted.

In addition, when only the vertical parting line is detected as a parting line, the degree of left-right symmetry tends to be small and the degree of up-down symmetry tends to be large. Therefore, the calculation processing of the degree of left-right symmetry in the degree-of-edge-symmetry calculation processing or the degree-of-color-symmetry calculation processing may be omitted.

In this way, the degree-of-symmetry calculation processing is executed after the parting line detection processing, and hence a part or the whole of the degree-of-symmetry calculation processing may be omitted depending on the calculation result of the parting line detection processing. Therefore, the composition of the input image can be classified with a lower-cost operation.

While, in the above description, the image processing device has been described in which the composition of the input image is classified with an image, captured by an imaging device or the like, as the input image, a configuration in which the composition of the captured image that has been captured is directly classified may be provided in the imaging device.

[Example of Configuration of Imaging Device]

Figure 43:
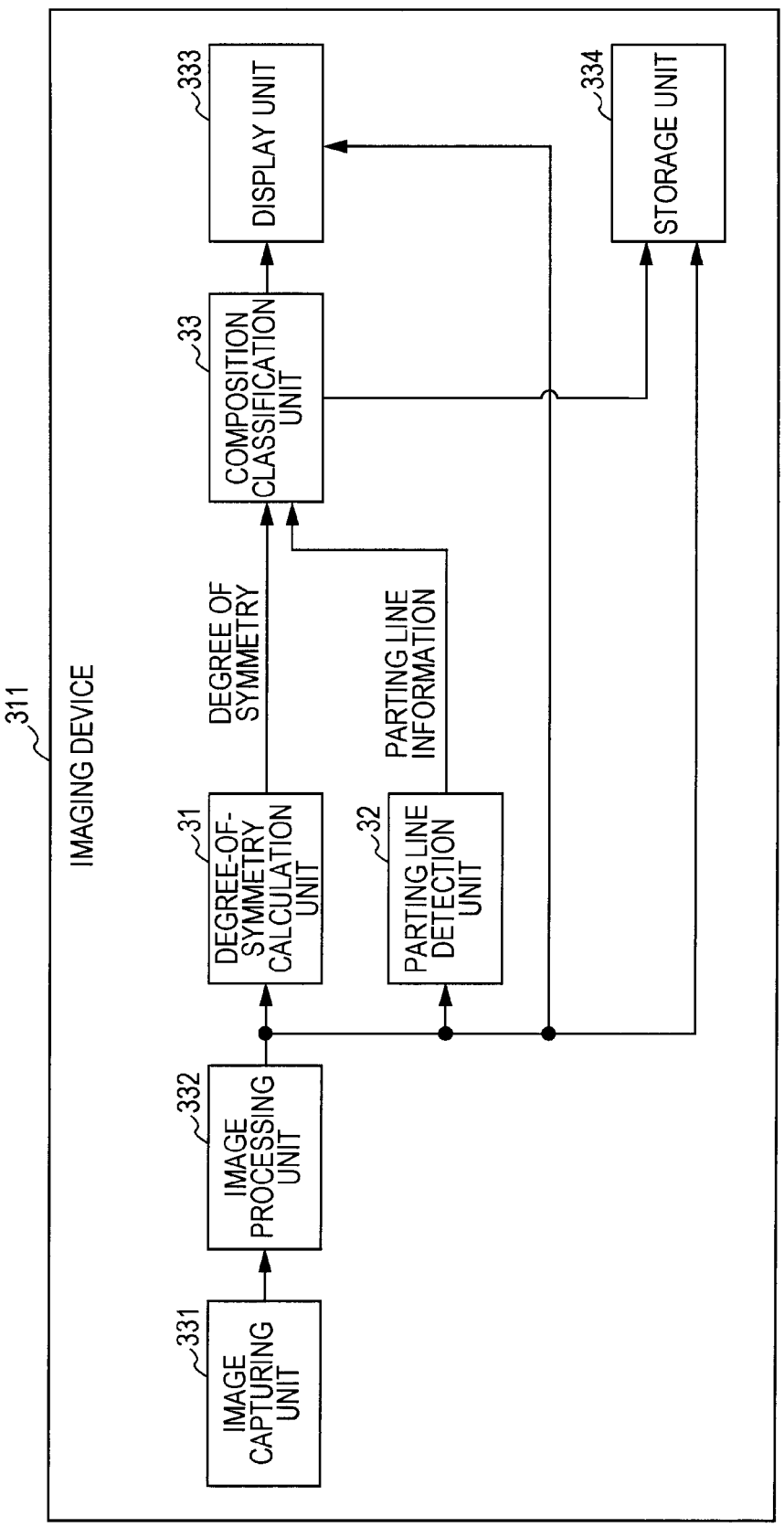
FIG. 43 is a block diagram illustrating an example of a functional configuration of an imaging device.

FIG. 43 illustrates an example of the configuration of an imaging device in which the composition of the captured image that has been captured is classified. In addition, in an imaging device 311 in FIG. 43, the same name and the same sign are assigned to the same configuration having the same function as that provided in the image processing device 11 in FIG. 1, and the description thereof will be omitted.

Namely, the imaging device 311 in FIG. 43 differs from the image processing device 11 in FIG. 1 in that an image capturing unit 331, an image processing unit 332, a display unit 333, and a storage unit 334 are newly provided in the imaging device 311.

In addition, the composition classification unit in FIG. 43 supplies the degree of symmetry and the parting line information to the display unit 333 or the storage unit 334, along with a composition pattern (i.e., the composition classification unit in FIG. 43 generates a classification signal to cause at least one of display or storage of the classification).

The image capturing unit 331 includes an optical lens, an imaging element, and an Analog/Digital (A/D) conversion unit (these are not illustrated). In the image capturing unit 331, an imaging element is subjected to light entering the optical lens and performs photoelectric conversion, thereby imaging a subject, and an obtained analog image signal is subjected to A/D conversion. The image capturing unit 331 supplies, to the image processing unit 332, digital image data (captured image) obtained as the result of A/D conversion.

The image processing unit 332 performs image processing such as noise elimination processing or the like on the captured image from the image capturing unit 331, and supplies, as a real-time input image (so-called through-the-lens image), the captured image to the degree-of-symmetry calculation unit 31, the parting line detection unit 32, and the display unit 333. Namely, the degree-of-symmetry calculation unit 31 and the parting line detection unit 32 perform the degree-of-symmetry calculation processing and the parting line detection processing on the real-time input image as a moving image, respectively.

In addition, when the shutter operation of a user that operates the imaging device 311 operates a shutter button or the like not illustrated, the image processing unit 332 performs image processing such as noise elimination processing or the like on the captured image of that time, and supplies the input image as a still image to the degree-of-symmetry calculation unit 31, the parting line detection unit 32, and the storage unit 334. At this time, the degree-of-symmetry calculation unit 31 and the parting line detection unit 32 perform the degree-of-symmetry calculation processing and the parting line detection processing on the input image as a still image, respectively.

Along with the captured image (through-the-lens image) from the image processing unit 332, the display unit 333 displays information based on at least one of the composition pattern, the degree of symmetry, and the parting line information, supplied from the composition classification unit 33. For example, along with the through-the-lens image, the display unit 333 displays the name of a composition pattern into which the composition of the through-the-lens image is classified, scores quantifying the degree of left-right symmetry and the degree of up-down symmetry, and a parting line indicated by parting line information.

Along with the captured image (still image) from the image processing unit 332, the storage unit 334 stores, as the metadata of the captured image, the composition pattern, the degree of symmetry, and the parting line information, supplied from the composition classification unit 33.

Accordingly, images stored in the storage unit 334 can be searched or classified on the basis of the degree of symmetry or the parting line information (the position of a parting line).

Using such a configuration as described above, the imaging device 311 executes composition classification processing in which the composition of the captured image is classified. In addition, the composition classification processing performed in the imaging device 311 is executed in the same way as the composition classification processing performed in the image processing device 11, described with reference to FIG.

9 or FIG. 42, and the same advantageous effect is obtained. Therefore, the description thereof will be omitted.

Furthermore, the imaging device 311 may present a recommended composition to the user, on the basis of the composition pattern, the degree of symmetry, or the parting line information, obtained from the composition classification processing.

For example, when the degree of left-right symmetry of the through-the-lens image displayed by the display unit 333 is large and the image is classified into the composition pattern "between horizontal parting lines", the display unit 333 displays a horizontal parting line detected by the parting line detection processing, along with the through-the-lens image, as illustrated in the left portion of FIG. 44. At this time, for example, the user operates an operation unit not illustrated, and hence tripartition lines (dashed lines) indicating the composition based on the Rule of Thirds may be displayed, as illustrated in the right portion of FIG. 44. In addition, an arrow may be displayed which suggests that the user adjust the horizontal parting line detected by the parting line detection processing to a tripartition line corresponding to the horizontal parting line H2 indicated in FIG. 10.

In addition, when the through-the-lens image displayed by the display unit 333 shifts from a state in which the degree of left-right symmetry is small as illustrated in the left portion of FIG. 45 to a state in which the degree of left-right symmetry is large as illustrated in the right portion of FIG. 45, a line (dashed line) may be displayed which indicates that the composition becomes left-right symmetric.

Furthermore, it is assumed that the imaging device 311 has a configuration in which a main lens having a typical angle of view and a sub lens having a fully wider angle of view than the main lens are provided as optical lenses in the image capturing unit 331 and the display unit 333 is caused to display a composite image in which a main image captured through the main lens is combined with a sub image captured through the sub lens.

The composite image is an image in which the main image having a narrow angle of view is combined with a portion of the sub image having a wide angle of view so that the positions of a subject fit in each other, and by confirming the composite image, a user can confirm a composition having a wide range (composition corresponding to the sub image), which has been difficult to confirm using only the main image.

When, in the imaging device 311 having such a configuration as described above, the composition classification processing is individually performed on the main image and the sub image, and hence the degree of symmetry of the sub image is higher than the degree of symmetry of the main image or the parting line of the sub image is very close to the tripartition line of the composition based on the Rule of Thirds, a display may be performed which suggests that the user operate the imaging device 311 so that the composition of the main image becomes similar to the composition of the sub image.

As described above, since the user can find a recommended composition with respect to an image that is being captured, the user can do the shooting with a better composition. Furthermore, when a composition matches the recommended composition, the imaging device 311 may automatically perform the shutter operation.

In addition, it should be understood that the processing described above, in which the degree of symmetry is calculated, the parting line is detected, and the composition of the input image is classified on the basis of the degree of symmetry and the parting line, may also be performed for the moving image.

The sequence of processing operations described above may be executed using a piece of hardware or software. When the sequence of processing operations described above is executed using a piece of software, a program included in the software is installed from a program recording medium to a computer embedded in a piece of dedicated hardware or a computer, for example, a general-purpose personal computer, in which various kinds of functions can be executed by installing various kinds of programs.

Figure 46:
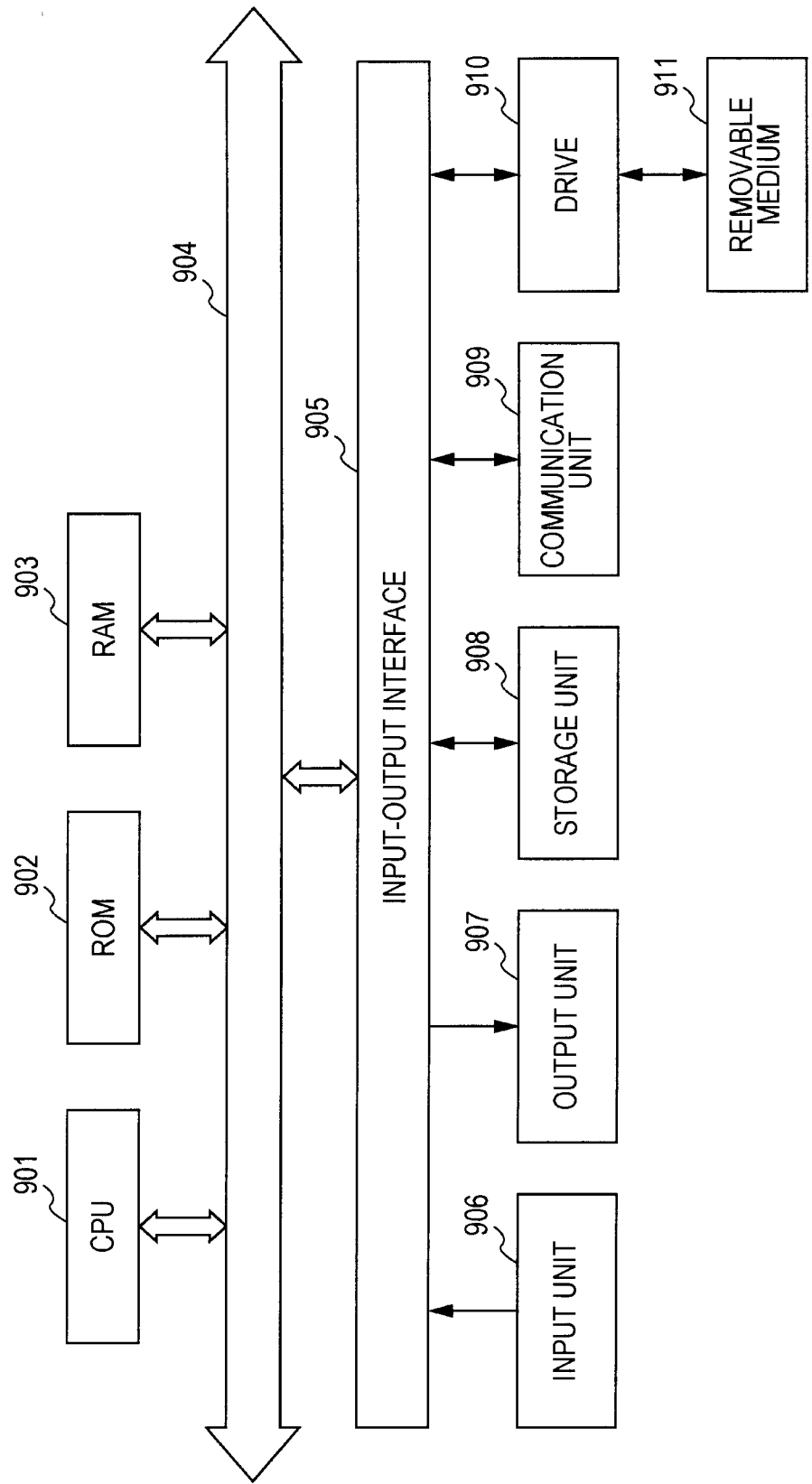
FIG. 46 is a block diagram illustrating an example of a configuration of computer hardware.

FIG. 46 is a block diagram illustrating an example of the configuration of the hardware of a computer that executes the sequence of processing operations using a program.

In the computer, the central processing unit (CPU) 901, a read only memory (ROM) 902, and a random access memory (RAM) 903 are connected to one another through a bus 904.

Furthermore, an input-output interface 905 is connected to the bus 904. An input unit 906 including a keyboard, a mouse, a microphone, and the like, an output unit 907 including a display, a speaker, and the like, a storage unit 908 including a hard disk, a nonvolatile memory, or the like, a communication unit 909 including a network interface or the like, a drive 910 driving a removable medium 911 (i.e., a non-transitory, computer-readable storage medium) such as a magnetic disk, an optical disk, a magneto-optical disk, a semiconductor memory, or the like are connected to the input-output interface 905.

In the computer having such a configuration as described above, for example, the CPU 901 loads the program stored in the storage unit 908 into the RAM 903 through the input-output interface 905 and the bus 904 and executes the program, thereby performing the sequence of processing operations described above.

For example, the program executed by the computer (CPU 901) is recorded in the removable medium 911 that is a package medium including a magnetic disk (a flexible disk is included therein), an optical disk (a compact disc-read only memory (CD-ROM), a digital versatile disc (DVD), or the like), a magneto-optical disk, a semiconductor memory, or the like, and is provided, or the program is provided through a wired or wireless transmission medium such as a local area network, Internet, or digital satellite broadcasting.

In addition, by loading the removable medium 911 into the drive 910, the program may be installed into the storage unit 908 through the input-output interface 905. In addition, the program may be received through the wired or wireless transmission medium by the communication unit 909, and installed into the storage unit 908. In addition, the program may be installed into the ROM 902 or the storage unit 908 in advance.

In addition, the program executed by the computer may be a program in which processing operations are executed in a time-series manner in the order described in the specification, and be a program in which processing operations are executed in parallel or at necessary times such as times when calling operations are performed or the like.

In addition, an embodiment of the presently disclosed technology is not limited to the above-mentioned embodiments, and various modifications may occur as they are within the scope of the presently disclosed technology.

What is claimed is:

1. A device for processing an input image, comprising:
   a degree-of-symmetry calculation unit configured to:
   receive the input image; and
   calculate a degree of symmetry of the input image;
   a parting line detection unit configured to:
   receive the input image; and
   detect a parting line that separates two sides of the input image;
   a classification unit configured to:
   classify the input image based on the degree of symmetry and the parting line; and generate a classification signal to cause at least one of display or storage of the classification, wherein the degree-of-symmetry calculation unit includes a degree-of-color-symmetry calculation unit configured to calculate a degree of color symmetry of the input image, and wherein the degree-of-color-symmetry calculation unit includes:

a first degree-of-color-symmetry calculation unit configured to calculate a degree of color symmetry with respect to a first imaginary line of the input image; and a second degree-of-color-symmetry calculation unit configured to calculate a degree of color symmetry with respect to a second imaginary line of the input image, the second imaginary line being angled with respect to the first imaginary line.

2. The device of claim 1, wherein the second imaginary line is perpendicular to the first imaginary line.

3. The device of claim 2, wherein the first imaginary line is parallel to a side of the input image.

4. The device of claim 1, wherein the degree-of-color-symmetry calculation unit includes a color space conversion unit configured to convert a first color space of each pixel of the input image into a second color space.

5. A device for processing an input image, comprising:

a degree-of-symmetry calculation unit configured to:
  receive the input image; and
  calculate a degree of symmetry of the input image;

a parting line detection unit configured to:
  receive the input image; and
  detect a parting line that separates two sides of the input image;

a classification unit configured to:
  classify the input image based on the degree of symmetry and the parting line; and
  generate a classification signal to cause at least one of display or storage of the classification, wherein the degree-of-symmetry calculation unit includes a degree-of-color-symmetry calculation unit configured to calculate a degree of color symmetry of the input image, wherein the degree-of-symmetry calculation unit includes a degree-of-edge-symmetry calculation unit configured to calculate a degree of edge symmetry of the input image, wherein the degree-of-edge-symmetry calculation unit includes an edge image generation unit configured to generate an edge image that indicates edges of the input image based on the input image, and wherein the degree-of-edge-symmetry calculation unit includes:

a first degree-of-edge-symmetry calculation unit configured to calculate a degree of edge symmetry with respect to a first imaginary line of the edge image; and a second degree-of-edge-symmetry calculation unit configured to calculate a degree of edge symmetry with respect to a second imaginary line of the edge image, the second imaginary line being angled with respect to the first imaginary line.

6. A device for processing an input image, comprising:

a degree-of-symmetry calculation unit configured to:
  receive the input image; and
  calculate a degree of symmetry of the input image;

a parting line detection unit configured to:
  receive the input image; and
  detect a parting line that separates two sides of the input image;

a classification unit configured to:
  classify the input image based on the degree of symmetry and the parting line; and
  generate a classification signal to cause at least one of display or storage of the classification, wherein the degree-of-symmetry calculation unit includes a degree-of-color-symmetry calculation unit configured to calculate a degree of color symmetry of the input image, wherein the degree-of-symmetry calculation unit includes a degree-of-edge-symmetry calculation unit configured to calculate a degree of edge symmetry of the input image, and wherein the degree-of-symmetry calculation unit includes a degree-of-symmetry determination unit configured to determine the degree of symmetry of the input image based on the degree of color symmetry of the input image and the degree of edge symmetry of the input image.

7. A device for processing an input image, comprising:

a degree-of-symmetry calculation unit configured to:
  receive the input image; and
  calculate a degree of symmetry of the input image;

a parting line detection unit configured to:
  receive the input image; and
  detect a parting line that separates two sides of the input image;

a classification unit configured to:
  classify the input image based on the degree of symmetry and the parting line; and
  generate a classification signal to cause at least one of display or storage of the classification, wherein the parting line detection unit includes an edge image generation unit configured to generate an edge image that indicates edges of the input image based on the input image, and wherein the parting line detection unit includes:

a first parting line detection unit configured to detect a first parting line that separates two sides of the input image based on the edge image; and a second parting line detection unit configured to detect a second parting line that separates two sides of the input image based on the edge image, the second parting line being angled with respect to the first parting line.

8. The device of claim 7, wherein the second parting line is perpendicular to the first parting line.

9. The device of claim 8, wherein the parting line detection unit includes a third parting line detection unit configured to detect a third parting line that separates two sides of the input image based on the edge image, the third parting line being angled with respect to the first and second parting lines.

* * * * *